US011891133B2

(12) United States Patent
Erickson et al.

(10) Patent No.: US 11,891,133 B2
(45) Date of Patent: Feb. 6, 2024

(54) VEHICLES HAVING A MOVEABLE CONTROL CONSOLE

(71) Applicant: Vermeer Manufacturing Company, Pella, IA (US)

(72) Inventors: Daniel Ray Erickson, Pella, IA (US); Tenny Lynn Hinshaw, Kellogg, IA (US); David Joseph Hackman, Pella, IA (US); Edward Darrin Hastings, Pella, IA (US)

(73) Assignee: Vermeer Manufacturing Company, Pella, IA (US)

(*) Notice: Subject to any disclaimer, the term of this patent is extended or adjusted under 35 U.S.C. 154(b) by 832 days.

(21) Appl. No.: 16/838,728

(22) Filed: Apr. 2, 2020

(65) Prior Publication Data

US 2020/0317050 A1 Oct. 8, 2020

Related U.S. Application Data

(60) Provisional application No. 62/829,896, filed on Apr. 5, 2019.

(51) Int. Cl.
*B62D 51/00* (2006.01)
*E02F 9/20* (2006.01)
(Continued)

(52) U.S. Cl.
CPC .......... *B62D 51/001* (2013.01); *A01B 69/007* (2013.01); *B60K 26/02* (2013.01); *E02F 9/20* (2013.01); *A01G 23/067* (2013.01); *B60K 2026/024* (2013.01); *B60K 2026/029* (2013.01); *B62D 51/04* (2013.01); *E02F 3/961* (2013.01); *E02F 5/08* (2013.01)

(58) Field of Classification Search
CPC ............ B62D 33/073; B60K 2026/024; A01G 23/067
USPC ........................................ 180/326, 332, 334
See application file for complete search history.

(56) References Cited

U.S. PATENT DOCUMENTS 3,431,983 A * 3/1969 Jacobson ................ E21B 7/025
173/193
3,568,740 A * 3/1971 Speakman ........... A01G 23/067
175/219
(Continued)

FOREIGN PATENT DOCUMENTS

AT 229825 B * 10/1963
DE 3015408 A1 10/1981
(Continued)

OTHER PUBLICATIONS

Bandit Industries, "Brush Bandit Stump Grinder Models 2600/2700 Operating & Parts Manual", Oct. 2014, 85 pages.
(Continued)

*Primary Examiner* — Minnah L Seoh
*Assistant Examiner* — Felicia L. Brittman
(74) *Attorney, Agent, or Firm* — Armstrong Teasdale LLP

(57) ABSTRACT

Vehicles having a control console that may be moved between a plurality of locations relative to the body of the vehicle are disclosed. The control console may include a direction control device for controlling movement of the vehicle that is adaptive such that movement of the vehicle is based on both the direction at which the direction control device is actuated and the sensed position of the control console.

26 Claims, 18 Drawing Sheets

(51) Int. Cl.
*E02F 3/96* (2006.01)
*B62D 51/04* (2006.01)
*B60K 26/02* (2006.01)
*A01B 69/00* (2006.01)
*E02F 5/08* (2006.01)
*A01G 23/06* (2006.01)

(56) References Cited

U.S. PATENT DOCUMENTS

| | | | | |
|---|---|---|---|---|
| 3,685,557 | A | * | 8/1972 | Groce ................ A01G 23/067 144/24.12 |
| 3,809,344 | A | * | 5/1974 | Kolderup ............. E21B 7/025 173/28 |
| 5,086,869 | A | | 2/1992 | Newberry et al. |
| 5,203,388 | A | * | 4/1993 | Bowling ............. A01G 23/067 37/302 |
| 6,026,871 | A | * | 2/2000 | Chapman ............ A01G 23/067 173/28 |
| 6,253,869 | B1 | * | 7/2001 | Wilson ................ B60K 20/02 180/326 |
| 7,159,687 | B2 | | 1/2007 | Dunn et al. |
| 7,347,299 | B2 | | 3/2008 | Billiger et al. |
| 8,783,308 | B2 | * | 7/2014 | Kappel ............... A01G 23/067 241/101.76 |
| 10,144,316 | B2 | | 12/2018 | Peterson et al. |

FOREIGN PATENT DOCUMENTS

GB 2440732 A 2/2008
WO 2017218669 A1 12/2017

OTHER PUBLICATIONS

Ditch Witch 410SX, available before Apr. 5, 2019.
Vermeer LM42, available before Apr. 5, 2019.
New Holland TV140 bi-direction tractor, https://www.youtube.com/watch?v=w46v5Bk6a3A, Jan. 24, 2017.
Vermeer PTX40, available before Apr. 5, 2019.
Vermeer PTX44, available before Apr. 5, 2019.
Genie Operator's Manual Z-45/25, Z-45/25J, A Terex Company, Fourth Edition, Second Printing, 1999, Preface and p. 5.
Terex Aerials Operator's Manual, Self-Propelled Knuckle Boom Lift Model TA64, Jun. 1997, Cover page and p. 4-5.

* cited by examiner

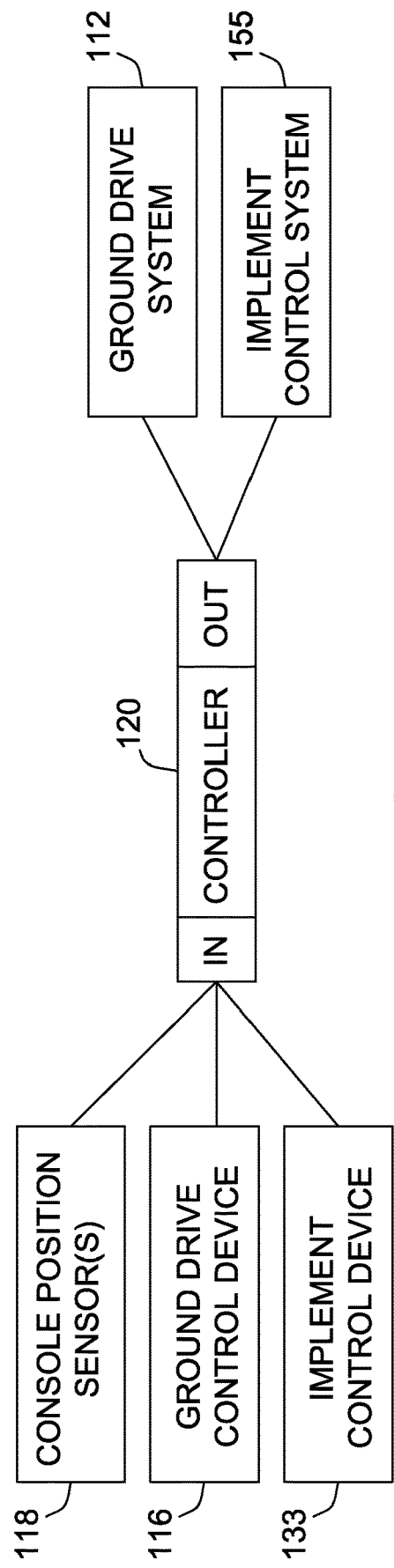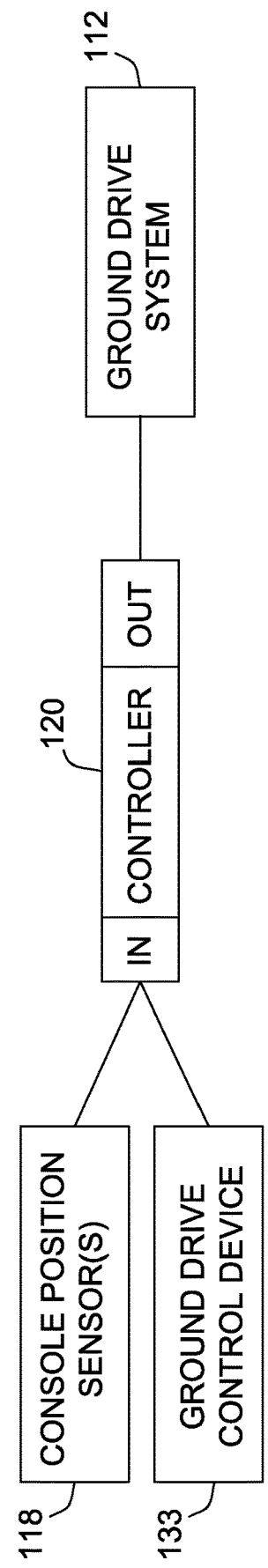
FIG. 12
FIG. 13

VEHICLES HAVING A MOVEABLE CONTROL CONSOLE

CROSS-REFERENCE TO RELATED APPLICATION

This application claims the benefit of U.S. Provisional Patent Application No. 62/829,896, filed Apr. 5, 2019, which is incorporated herein by reference in its entirety.

FIELD OF THE DISCLOSURE

The present disclosure relates to vehicles having a control console that may be moved between a plurality of locations relative to the body of the vehicle and, in particular, to vehicles that have adaptive control systems that sense the position of the control console.

BACKGROUND

Some vehicles such as utility tractors may include a control console at the side of the vehicle that allows the direction of the vehicle to be controlled. An operator may stand at the side of the vehicle (i.e., generally facing its longitudinal axis) to operate the controls that are used to move the vehicle. The control console may also include control devices that control the function of an implement or tool attached to the vehicle (e.g., the direction of travel of the implement or tool).

It is desirable to arrange the console such that it is moveable and can be arranged on either side of the vehicle or even toward the rear of the vehicle. Moving the control console between positions may cause confusion as to which direction the controls (e.g., joysticks or toggle switches) should be actuated to move the vehicle or implement. For example, when the control console is disposed on the left side of the vehicle, the front of the vehicle is toward the left side of the control console. When the console is swung to the right side of the vehicle, the front of the vehicle is toward the right of the control console. Actuation of a control device toward the front of the vehicle by an operator (e.g., moving a joystick toward the front of the vehicle) would cause different movement of the vehicle depending on which side of the vehicle the control console is positioned. Repositioning of the console relative to the vehicle may lead to operator confusion, causing an operator to inadvertently move the vehicle in a direction unintended by the operator.

A need exists for vehicles that have adaptive controls such that actuation of a control device in a given direction causes the same movement of the vehicle regardless of where the console is positioned relative to the body of the vehicle.

SUMMARY

One aspect of the present disclosure is directed to a vehicle having a front, rear, first and second sides, and a central longitudinal axis that passes through the front and rear. The vehicle includes a ground drive system and a console moveable between first and second positions disposed opposite each other across the central longitudinal axis. A direction control device is supported by the console. The direction control device is configured to selectively control movement of the vehicle in a forward direction and a rearward direction. The direction control device is moveable by a user along a control axis. A sensor system senses when the console is in the first position or in the second position. A control unit is communicatively connected to the sensor system. The control unit is configured to cause the ground drive system to move the vehicle in the forward direction when the direction control device is moved along its control axis toward the front of the vehicle in both the first and second positions of the console and to move the vehicle in the rearward direction when the direction control device is moved along its control axis toward the rear of the vehicle in both the first and second positions of the console.

Another aspect of the present disclosure is directed to a vehicle having a front, rear, first and second sides, and a central longitudinal axis that passes through the front and rear. The vehicle includes a ground drive system. A console is moveable between first and second positions disposed opposite each other across the central longitudinal axis. The console has a console front disposed laterally outward from a console rear when the console is in the first and second positions. The console has a console first side and a console second side. The console first side is disposed forward of the console second side relative to the central longitudinal axis when the console is in the first position and the console first side is disposed rearward of the console second side relative to the central longitudinal axis when the console is in the second position. A direction control device is supported by the console. The direction control device is configured to selectively control movement of the vehicle in a forward direction and a rearward direction. A sensor system senses when the console is in the first position or in the second position. A control unit is communicatively connected to the sensor system. The control unit controls the direction at which the ground drive system moves the vehicle based at least in part on the sensor system detecting the console in the first position or in the second positon.

Yet another aspect of the present disclosure is directed to a vehicle having a front, rear, first and second sides, and a central longitudinal axis that passes through the front and rear. The vehicle includes a powered system for moving at least a portion of the vehicle. A control console is configured to be operated by a user standing alongside the control console to control the powered system. The control console is moveable between at least two positions selected from first and second positions disposed opposite each other across the central longitudinal axis and a third position laterally disposed between the first position and the second position and more toward the rear of the vehicle relative to the first and second positions. A control device is supported by the control console. The control device is configured to selectively control movement of the powered system in a first direction or a second direction by moving a portion of the control device relative to the control console. A sensor system senses the position of the control console relative to the vehicle. A control unit is communicatively connected to the sensor system. The control unit controls the direction at which the powered system moves at least part of the vehicle based at least in part on the sensor system detecting the position of the control console relative to the vehicle and a direction at which the control device is moved such that the direction of movement of at least part of the vehicle matches the direction the control device is moved relative to the vehicle.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 12 is a schematic of a control system in which (1) the direction the vehicle is moved and (2) the function of an implement are controlled based at least in part on the sensed position of the console;

FIG. 13 is a schematic of a control system in which the direction the vehicle is moved is controlled based at least in part on the sensed position of the console without implement control;

Corresponding reference characters indicate corresponding parts throughout the drawings.

DETAILED DESCRIPTION

Figure 1:
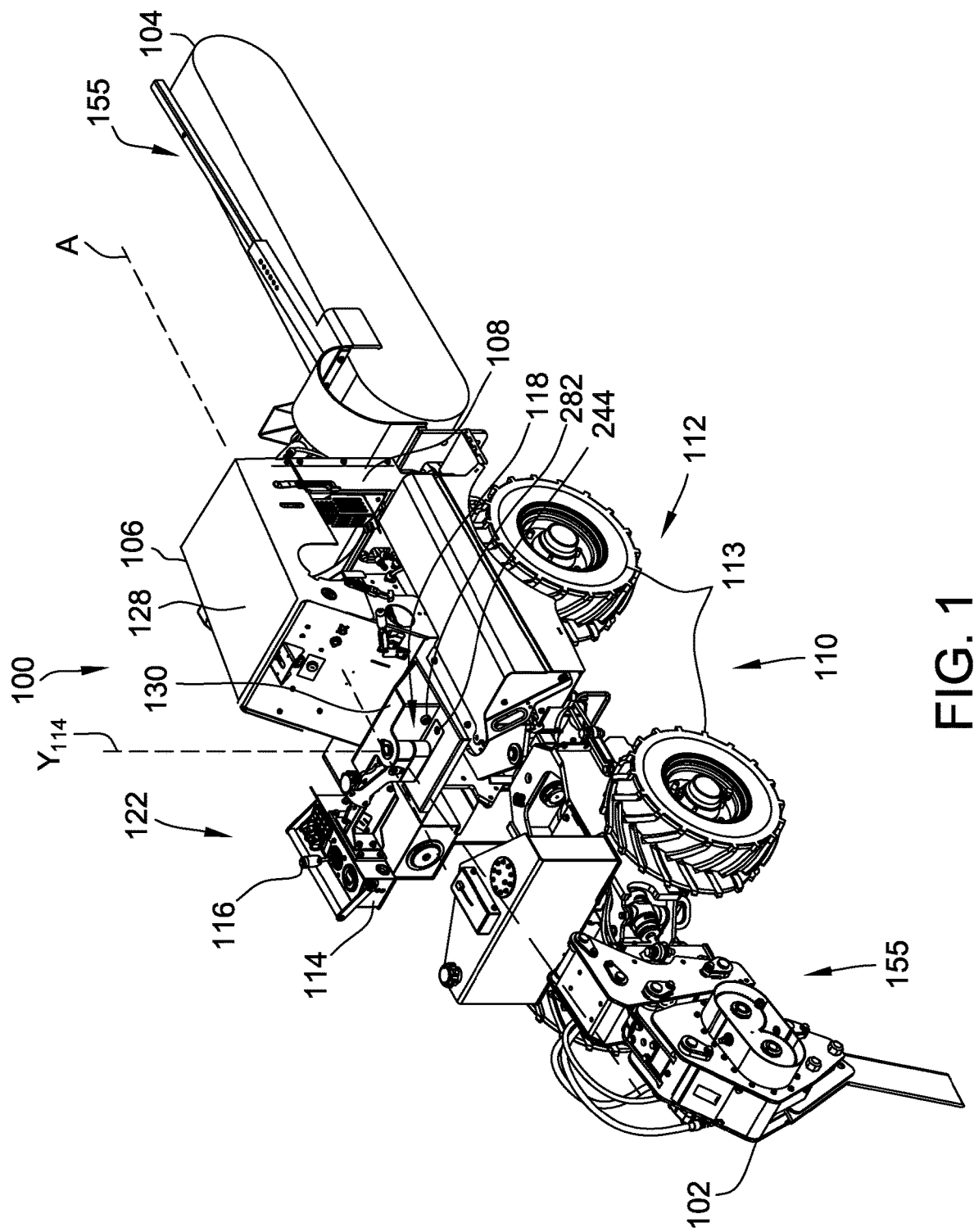
FIG. 1 is a perspective view of an example vehicle with a console in a first operating position.
Figure 11:
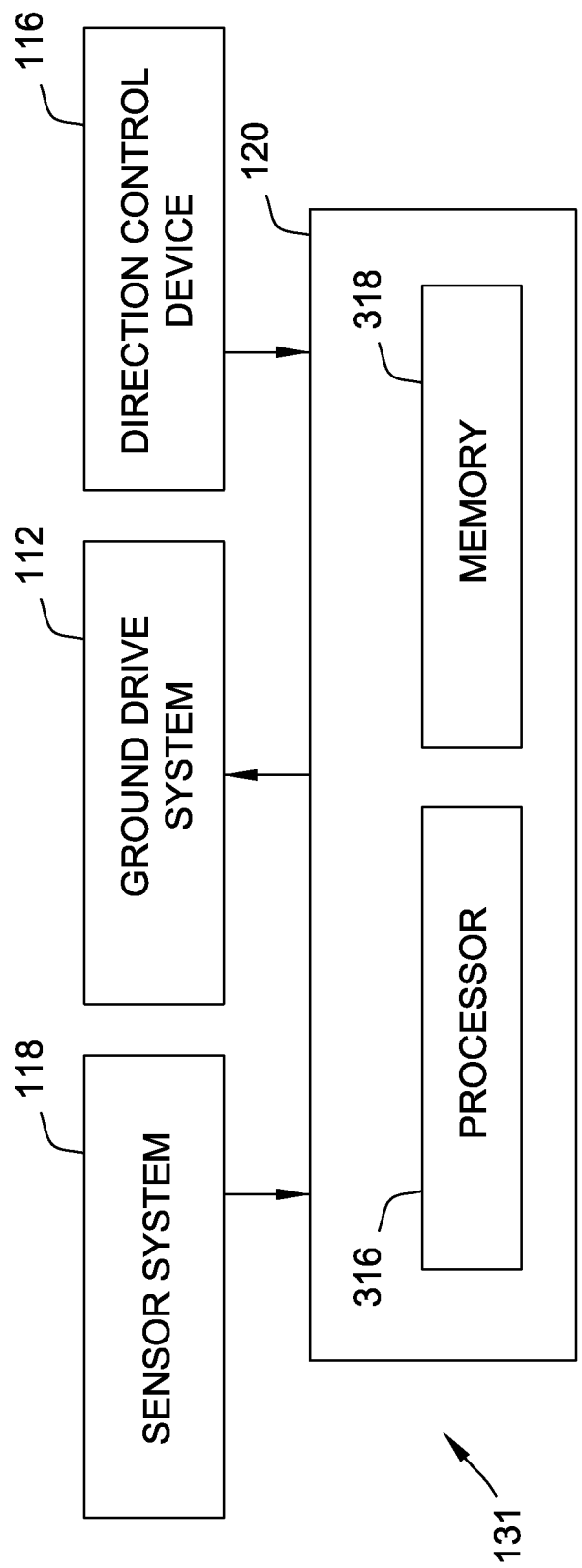
FIG. 11 is a schematic of a control system for controlling movement of the vehicle.

An example vehicle 100 of the present disclosure is indicated generally as "100" in FIG. 1. The vehicle 100 includes a ground drive system 112, a console 114 and a direction control device 116 supported by the console 114. The console 114 is moveable about the body 128 of the vehicle 100 with the position of the console 114 being sensed by a sensor system 118 (FIG. 11). A control unit 120 controls the ground drive system 112 based on (1) the direction in which the direction control device 116 is actuated by a user and (2) the sensed position of the console 114.

The vehicle 100 includes a front 102, a rear 104, and a first side 106 and second side 108 that extend between the front 102 and rear 104 of the vehicle 100. As used herein, the term "vehicle" should generally be construed broadly to include any type of machine or implement that may be controlled by an operator standing near or riding on the vehicle. Example vehicles include stump grinders, tractors, trenchers, fork trucks, excavators, and the like. In the illustrated embodiment, the vehicle 100 is a utility tractor.

The vehicle 100 includes a central longitudinal axis A that extends through the front 102 and the rear 104 of the vehicle 100. In embodiments in which the vehicle articulates such as the utility tractor 100 shown in FIG. 1, the central longitudinal axis A extends through the front 102 and rear 104 of the vehicle 100 when the articulating portions of the vehicle 100 are aligned (i.e., without being articulated). Generally, the central longitudinal axis runs A through the midpoint between the first and second sides 106, 108 of the vehicle.

The vehicle 100 may include an implement 155 mounted thereon. In the embodiment illustrated in FIGS. 1-4, the implement 155 includes a vibratory plow and a trencher. In the embodiments illustrated in FIGS. 16-19, the implement 155 includes a stump cutter. In other example embodiments, the implement 155 may include a vibratory plow, a trencher, tiller, log splitter, and the like.

Figure 10:
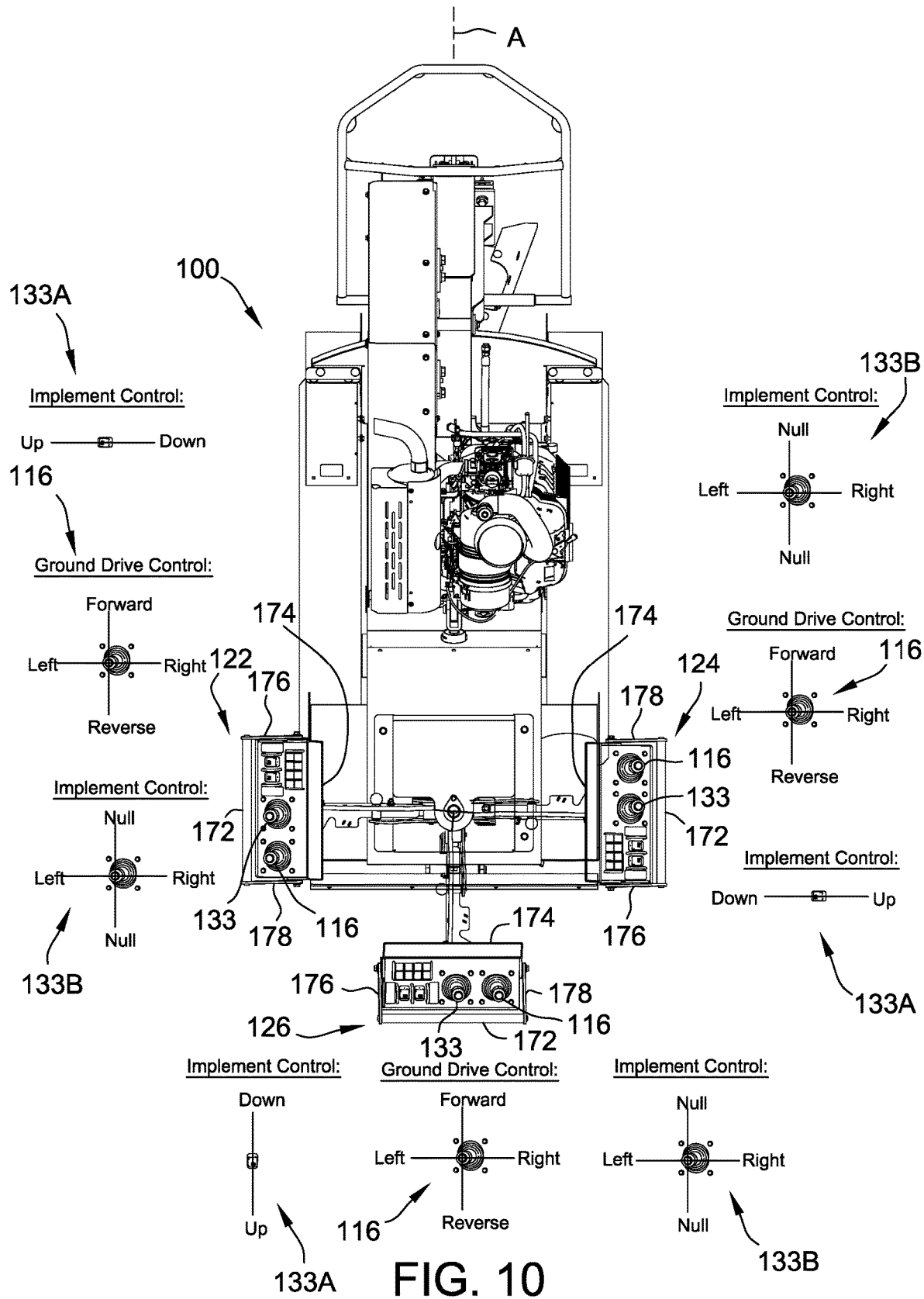
FIG. 10 is a schematic of the three operating positions of the console relative to the body of the vehicle.

The vehicle 100 includes a powered system 110 which may be controlled based on the positon of the console 114 as further described below. In the embodiment illustrated in FIGS. 1-4, the powered system 110 is a ground drive system 112. In other embodiments, the powered system 110 may be an implement 155 (FIGS. 16-19) such as a sweep system for moving a boom 159 that is powered by the powered system 110. The console 114 may include an implement control device 133 (FIG. 10). The implement control device 133 may control the function and/or motion of the implement 155 by transmitting a signal to the powered system 110. The vehicle 100 may be self-propelled and include a ground drive system 112. The ground drive system 112 includes components used to propel the vehicle 100 forward or rearward. The ground drive system 112 may include tires 113 as shown in FIGS. 1-4 or may include tracks 115 as shown in the vehicle 100 of FIGS. 16-19. The ground drive system 112 may include an engine that drives the ground drive system 112. The ground drive system 112 may be driven mechanically such as through a drive shaft or may be hydraulically driven (e.g., by one or more hydraulic pumps). In hydraulic systems, the ground drive system 112 may include one or more valves, hydraulic pumps, hydraulic motors, and/or actuators that may be used to adjust the direction of movement of the vehicle 100. In mechanical systems, a transmission or gearbox may be used to reverse the direction of the vehicle 100.

The vehicle 100 includes a console 114 (e.g., control console) that is moveable relative to a body 128 of the vehicle 100. The console 114 is moveable between at least one of a first position 122 (FIG. 1) and a second position 124 (FIG. 2) relative to the body 128 of the vehicle 100. The first position 122 is disposed opposite the second position 124 across the central longitudinal axis A of the vehicle 100. In the first position 122, the console 114 may be accessible by an operator positioned substantially near the first side 106 of the vehicle 100. In the second position 122 the console 114 may be accessible by an operator positioned substantially near the second side 108 of vehicle 100. For example, the console 114 may be selectively positioned such that an operator may access the console 114 while standing and/or walking along side either the first side 106 and/or the second side 108 of the vehicle 100 (e.g., without a seat that is accessible by a user in the first or second positions 122, 124 of the console 114). In other embodiments, the operator may access the console 114 while sitting or riding on the vehicle 100.

In another example embodiment, the console 114 may be positioned in a third position 126 (FIGS. 10 and 18) laterally disposed between the first position 122 and the second position 124. For example, in the third position 126 the console 114 may be arranged more near the rear 104 of the vehicle 100 relative to the first and second positions 122, 124. In the third position 126, the console 114 may be accessible by an operator positioned substantially near the rear 104 of the vehicle. For example, an operator may access the console 114 while standing and/or walking near the rear 104 of the vehicle 100. The console 114 includes a handle 142 that may be grasped by a user to help move the console 114 about the body 128 of the vehicle 100.

Figure 5:
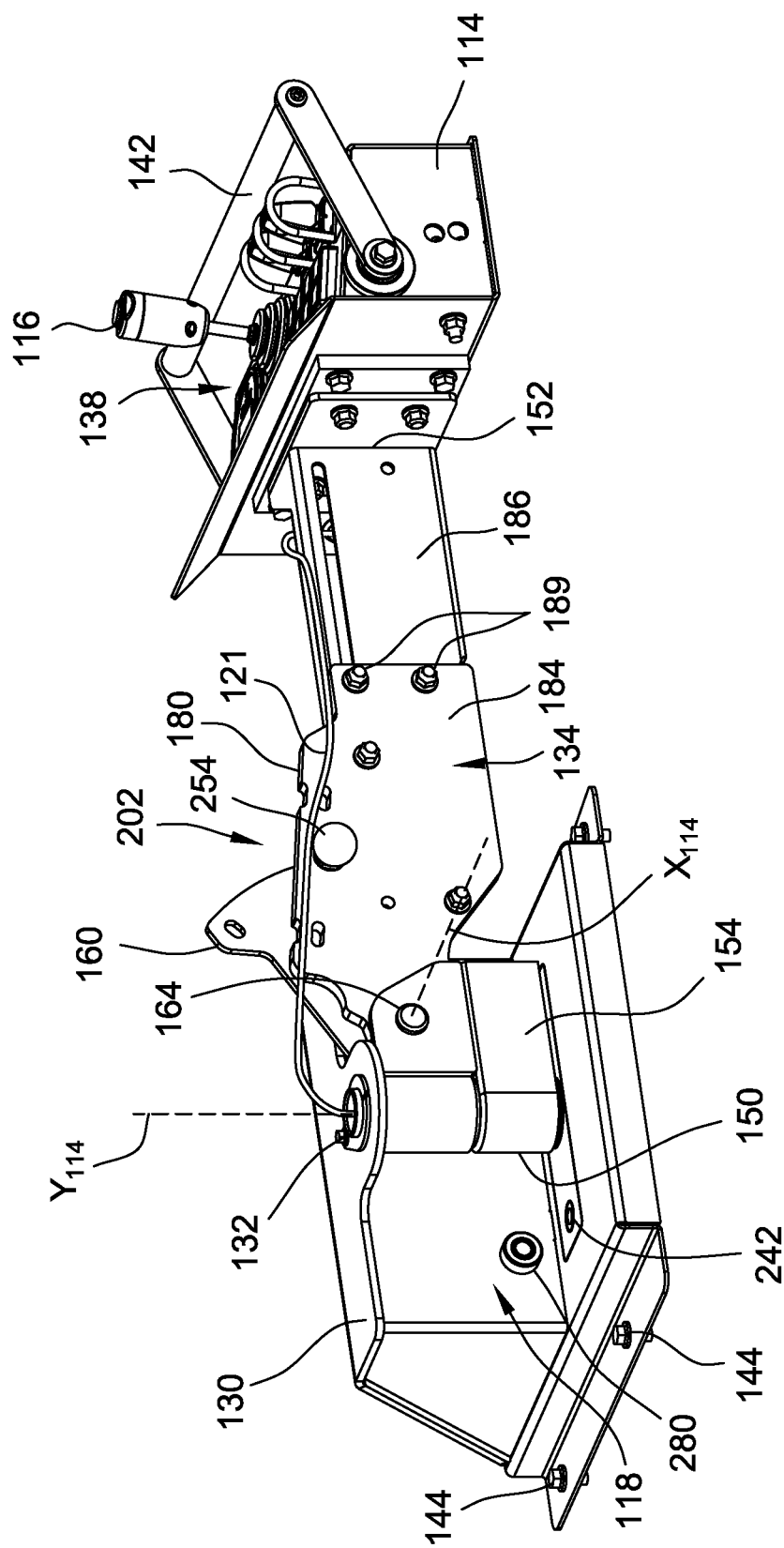
FIG. 5 is a front perspective view of the console and a support arm.

The vehicle 100 includes a console mount 130 that is connected to the body 128 of the vehicle 100. The console 114 is supported by a support arm 134 (FIG. 5) that is pivotally connected to the console mount 130 at a first rotational joint 132. The console 114 may rotate relative to the body 128 about a vertical pivot axis $Y_{114}$. The vertical pivot axis $Y_{114}$ is substantially perpendicular to the central longitudinal axis A (FIG. 1). As shown in FIG. 5, the console mount 130 is mounted to the body 128 by a plurality of fasteners 144 (e.g., bolts). In alternative embodiments, the console mount 130 may be may be welded to the body 128.

Referring now to FIGS. 5-8, the support arm 134 includes a first end 150 and a second end 152. The console 114 is mounted to the support arm 134 at the second end 152. The console 114 may be bolted, welded or otherwise connected to the support arm 134. The support arm 134 further includes a base 154, a securement plate 160 and frame 180. The securement plate 160 is coupled to the base 154 such that the securement plate 160 rotates with the base 154 about the vertical pivot axis $Y_{114}$. The frame 180 and console 114 pivot about a horizontal pivot axis $X_{114}$ that extends through a second rotational joint 164.

The base 154 (FIG. 7) includes a first through-hole 166 and a second through-hole 168. The first through-hole 166 is sized and shaped to receive a console mount shaft 171 about which the base 154 rotates. The support arm 134 and the console 114 are pivotally connected to the body 128 about the vertical pivot axis $Y_{114}$ allowing the support arm 134 to pivot relative to the central longitudinal axis A (FIG. 1). The support arm 134 and the console 114 may be manually pivoted by an operator. For example, an operator may grip the console handle 142 and apply a rotational force causing the support arm 134 to rotate about the vertical pivot axis $Y_{114}$ such that the operator may selectively move the console 114 laterally relative to the central longitudinal axis A. In alternative embodiments, the support arm 134 may include a drive system that rotates the support arm 134 about the vertical pivot axis $Y_{114}$.

The base 154 is connected to a frame 180 that is connected to the console 114. The frame 180 includes first and second frame plates 184, 186. The second frame plate 186 is coupled to the first frame plate 184 using a plurality of bolts 189. In alternative embodiments, the first and second frame plates 184, 186 may be coupled in any manner which enables the vehicle 100 to function as described herein. For example, the first and second frame plates 184, 186 may be welded together and/or the first and second frame plate 184, 186 may be formed of a single unit. In some embodiments, the first and second frame plates 184, 186 may be configured to enable the length of the support arm 134 to be adjusted.

The first and second frame plates 184, 186 and console 114 pivot about a horizontal pivot axis $X_{114}$ that extends through the base 154 to allow the console 114 to be raised and lowered. The horizontal pivot axis $X_{114}$ is generally perpendicular to the vertical pivot axis $Y_{114}$. As the console 114 rotates about the vertical pivot axis $Y_{114}$, the alignment of the horizontal pivot axis $X_{114}$ will change relative to the central longitudinal axis A. When the console 114 is in either the first position 122 or the second position 124, the horizontal pivot axis $X_{114}$ may be substantially parallel to the central longitudinal axis A (FIG. 1).

Figure 2:
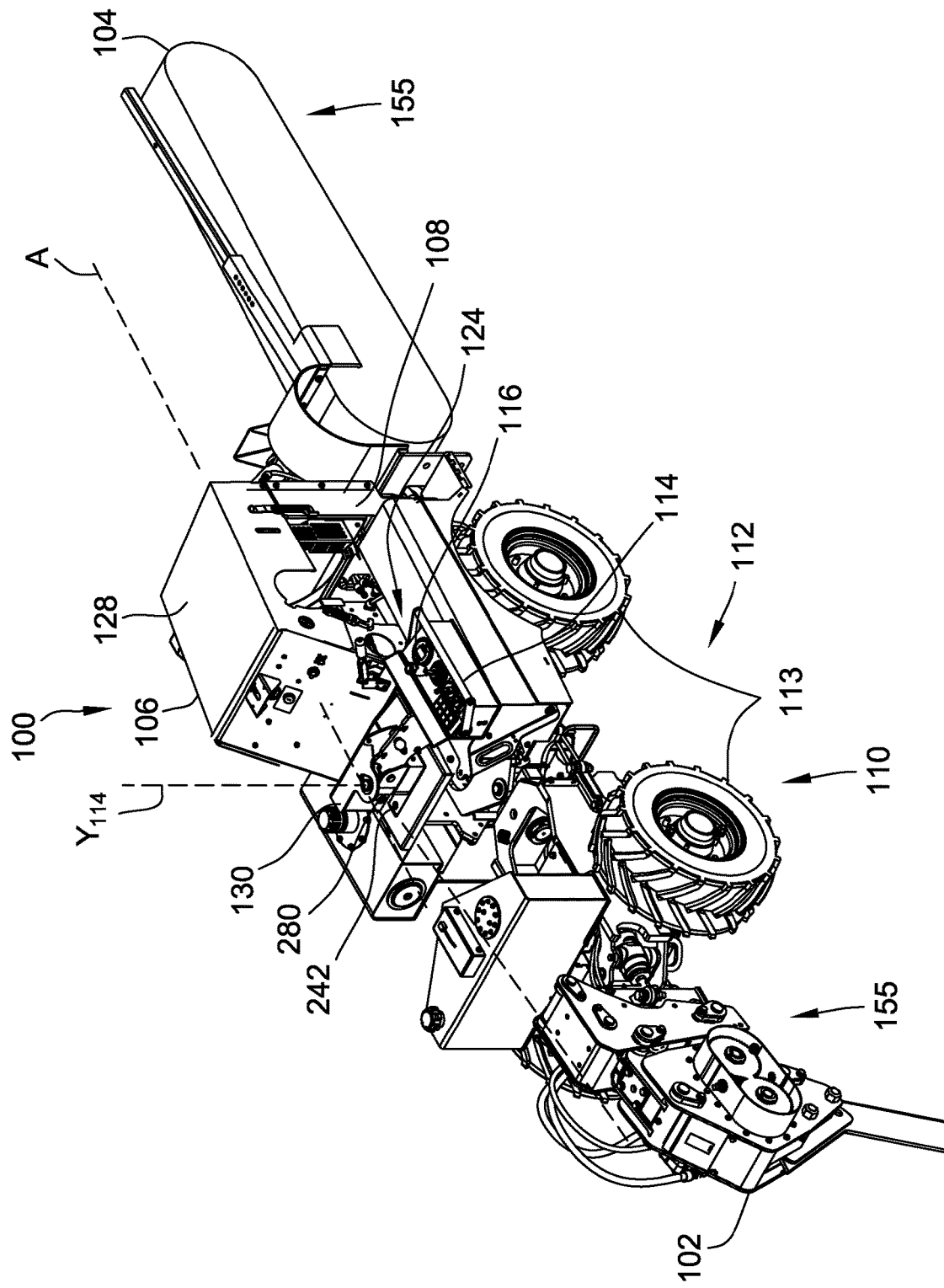
FIG. 2 is a perspective view of the vehicle with the console in a second operating position.
Figure 3:
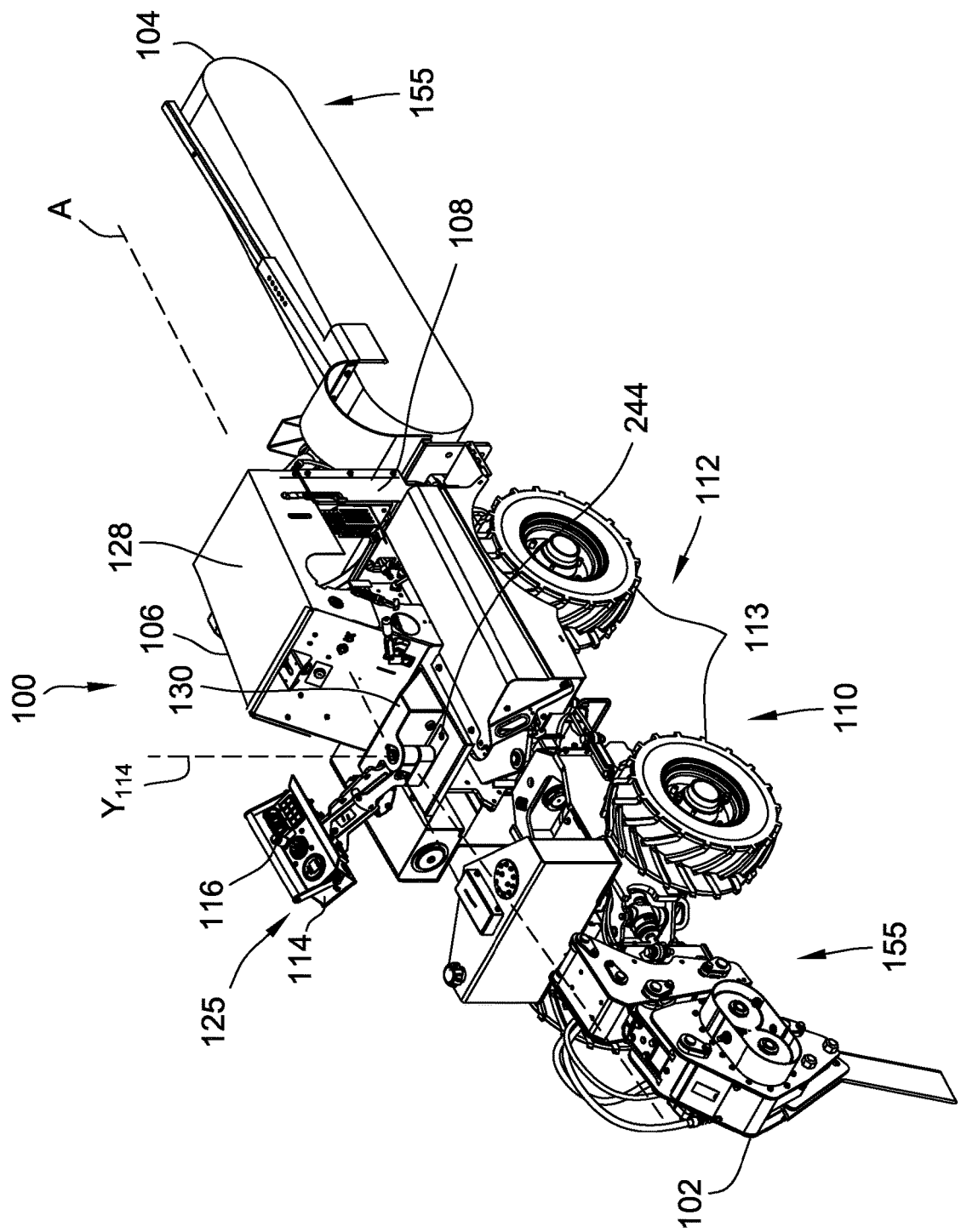
FIG. 3 is a perspective view of the vehicle with the console in a raised position.
Figure 4:
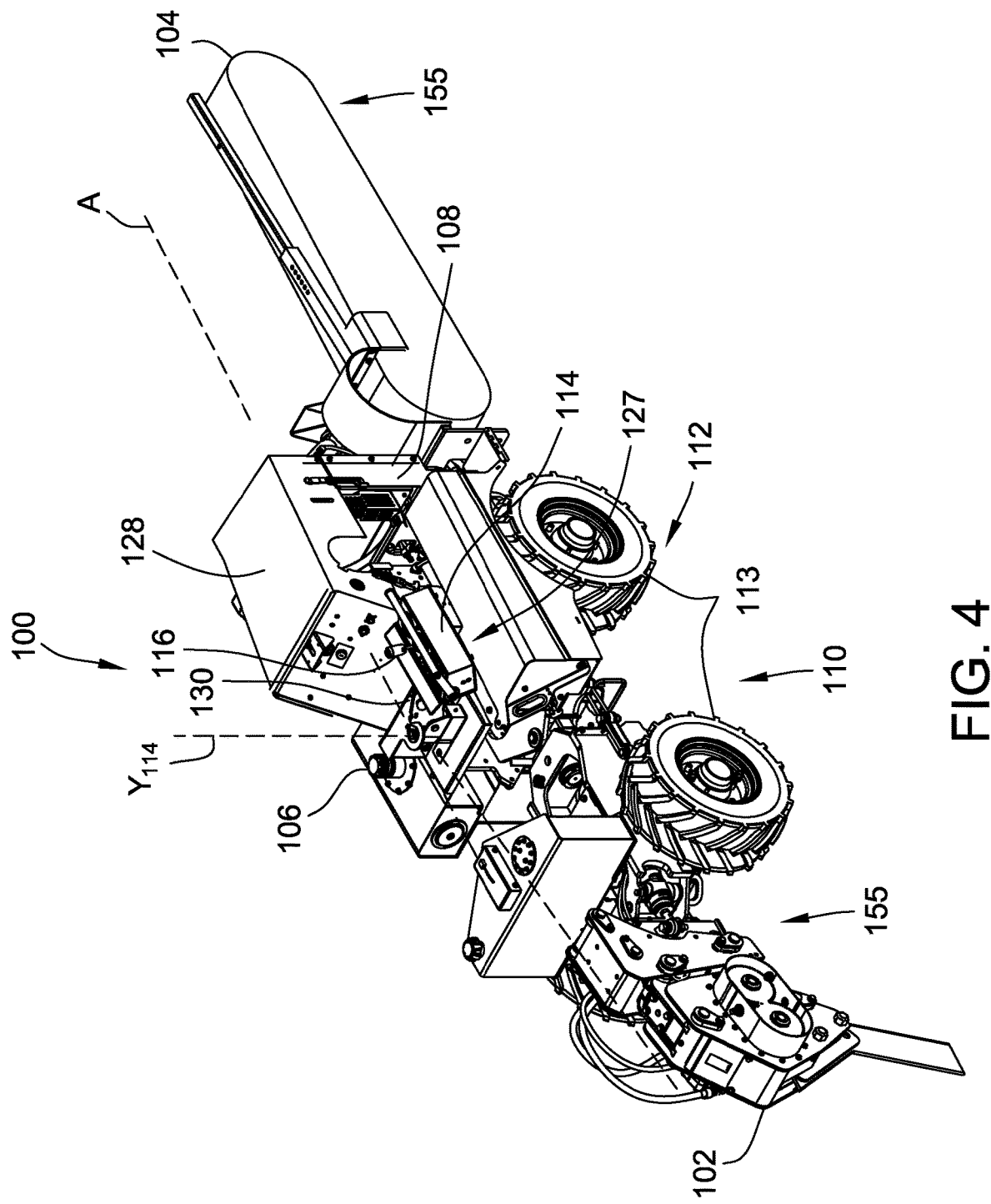
FIG. 4 is a perspective view of the vehicle with the console in another raised position.

To move the console 114 from the first position 122 (FIG. 1) to the second position 124 (FIG. 2), the console 114 is first moved from the lowered operating position 122 (i.e., the first position) by causing the console 114 and frame 180 to pivot about the horizontal pivot axis $X_{114}$ to raise the console 114 and frame 180 to a raised position 125 (FIG. 3). The console 114 and support arm 134 are then laterally swung across the central longitudinal axis A and to the raised position 127 shown in FIG. 4. The console 114 is then lowered to the second operating position 124 (FIG. 2).

The vehicle 100 includes a latching mechanism 200 (FIGS. 7 and 8) to secure the console 114 relative to the vertical pivot axis $Y_{114}$. The latching mechanism 200 includes a spring biased latch pin 204 and first and second latch openings 242, 244 for selectively receiving the latch pin 204. The latch openings 242, 244 are formed on the body 128 and/or on the console mount 130 and are disposed opposite each other on either side of the central longitudinal axis A. The spring biased latch pin 204 may be positioned in either a latched position in which at least a portion of the pin 204 is received in the first latch opening 242 or the second opening 244 or an unlatched position in which the pin 204 is raised and not disposed in either latch opening 242, 244.

The spring biased latch pin 204 includes a collar 208, a pin 210, and a spring 212. The spring 212 wraps around at least a portion of the pin 210. At least a portion of the spring 212 is coupled to the pin 210. The spring biased latch pin 204 extends through the second through-hole 168 of the base 154 such that the spring biased latch pin 204 rotates about the vertical pivot axis $Y_{114}$ with the console 114 and support arm 134.

The first frame plate 184 includes a cam portion 240. When the frame 180 is in the raised position (FIG. 7), the configuration of the cam portion 240 allows the spring biased latch pin 204 to be disengaged from the respective latch opening 242, 244. In the raised position, the console 114 may be moved laterally across the central longitudinal axis A of the vehicle 100 between the first position 122 and second position 124. Once the console 114 is in one of the first or second positions 122, 124, the frame 180 may be rotated about the horizontal pivot axis $X_{114}$, such that the console 114 may be lowered into a lowered operating position (FIG. 5). As the frame 180 is pivoted about the horizontal pivot axis $X_{114}$ to transition the console 114 from the raised position (FIG. 7) to the lowered operating position (FIG. 5), the cam portion 240 contacts the collar 208 causing the pin 210 to move downward toward the body 128 of the vehicle 100 and into the respective latch opening 242, 244. In this latched position, the rotational position of the console 114 is substantially fixed relative to the body 128 about the vertical pivot axis $Y_{114}$.

When the console 114 is in an operating position such as the first position 122 (FIG. 1), the pin 210 is aligned and received in the first latch opening 242 and when the console 114 is the second lowered operating position (FIG. 2), the pin 210 is aligned and received in the second opening 244. In this manner the spring biased latch pin 204 allows the console to be fixed relative to the body 128 of the vehicle when it is in the first or second positions.

The latch pin 204 is biased toward the unlatched position such that the pin 210 recedes from the first or second opening 242, 244 when the frame 180 and console 114 are raised. As the frame 180 is pivoted about the horizontal pivot axis $X_{114}$ to transition the support arm 134 from the lowered position to the raised position, the cam portion 240 rotates allowing the spring 212 to extend and force the pin 210 upwards from the base 154, such that the pin 210 will be disengaged with the respective latch opening 242, 244, allowing the support arm 134 to rotate relative to the body 128 about the vertical pivot axis $Y_{114}$. In alternative embodiments, the vehicle 100 may include a third latch opening 246 (FIG. 16) such that the console 114 may be positioned in a third position.

The vehicle 100 includes a locking mechanism 202 (FIGS. 5 and 6) to secure the console 114 relative to the horizontal pivot axis $X_{114}$. The locking mechanism 202 includes a spring-loaded locking plunger 256 (FIG. 6) connected to a knob 254. The plunger 256 may selectively be received in an upper opening 262 (FIG. 7) when the console 114 is in the raised position or received in the lower opening 264 when in the console 114 is in the lowered operating position. The knob 254 may be grasped by a user and a pulling force may be applied to cause the plunger 256 to recede from the respective opening 262, 264 to allow the console 114 and support arm 134 to pivot between the lowered and raised positions and about the horizontal pivot axis $X_{114}$.

An operator may grip the console handle 142 to raise the console 114 and then substantially fix the position of the console 114 in the raised position by placing the locking plunger 256 through the upper opening 262 of the securement plate 160. In the raised position there is sufficient clearance between the support arm 134 and the console 114 and the body 128 of the vehicle 100 to allow an operator to rotate the support arm 134 and console 114 about the vertical pivot axis $Y_{114}$ and across the longitudinal axis A of the vehicle 100 in either one of the first or second positions 122, 124. The operator may then unlock the locking mechanism 202 and may pull the handle 142 downward to position the console 114 into the lowered position. As the console 114 is lowered, the cam portion 240 of the frame 180 forces the spring biased latch pin 204 to pass through at least one of the latch openings 242, 244. The operator may then substantially fix the console 114 in the lowered position by placing the locking plunger 256 through the lower opening 264 of the securement plate 160.

When the console 114 is in the lowered position and the locking plunger 256 is engaged with the lower opening 264 and the spring biased latch pin 204 is disposed within at least one of the latch openings 242, 244, the console 114 is arranged in an operating position. In example embodiments, the vehicle 100 includes at least two operating positions, a first operating position 122 and a second operating position 124. In other embodiments, the vehicle 100 may include a third operating position or more. While the sensor and control systems described below may be shown and described in first and second operating positions, the sensor and control systems are also applicable to a third operating position or more than three operating positions.

Figure 9:
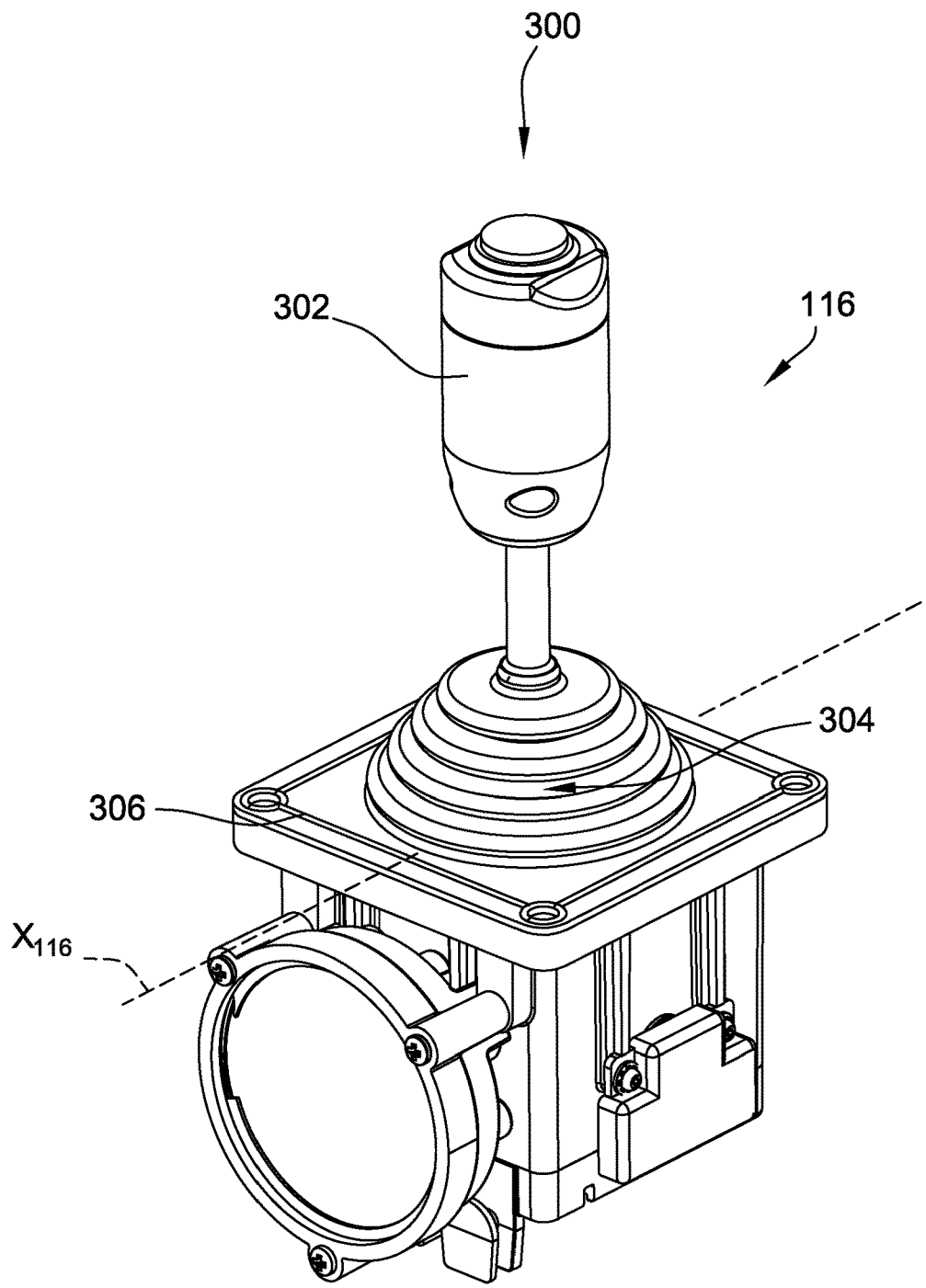
FIG. 9 is a perspective view of an example direction control device.

The control console 114 supports a direction control device 116. The direction control device 116 may selectively control movement of the vehicle 100 in a forward direction and a rearward direction. In some embodiments, the direction control device 116 also controls movement of the vehicle 100 in the direction of the first side 106 and in direction of the second side 108 of the vehicle 100 (e.g., left and right steering). Referring to FIG. 9, in this example embodiment, the direction control device 116 may be a control column 300 (e.g., joystick). The control column 300 includes a column 302, a joint 304, and a base 306. The direction control device 116 may selectively control movement of the vehicle 100 in at least one of a forward direction and/or a rearward direction. The direction control device 116 further includes a control axis $X_{116}$ (FIG. 9).

The direction control device 116 may be moved by a user along the control axis $X_{116}$ in order to control the movement of the vehicle. For example, the joint 304 allows an operator to pivot the column 302 about the base 306 such that the column 302 may be moved in at least two primary directions along the control axis $X_{116}$—i.e., forward and backwards. The column 302 may also be moved in two secondary directions, left and right, that are perpendicular to the control axis $X_{116}$. The direction control device 116 may also include a neutral upright position (N), for example, the column 302 may not be pivoted about the joint and the column 302 may be relatively centered on the base 306. In addition, the direction control device 116 may also be moved along the primary directions for a range of motions, allowing an operator to control the speed of the vehicle 100. For example, a user may rotate the column 302 about the joint 304, such that the column 302 may be positioned further away from the base 306, in order to increase the speed of the vehicle 100, or closer to the base 306, in order to decrease the speed of the vehicle 100. In alternative embodiments, the direction control device 116 may be one of a lever, toggle, and/or switch or any additional devices that may be positioned relative to the central longitudinal axis A in order to move the vehicle 100.

Referring now to FIG. 10, the console 114 may also include a console front 172, a console rear 174, a console first side 176, and a console second side 178. The console front 172 is disposed laterally outward from the console rear 174 when the console 114 is in either the first, second or third positions 122, 124, 126. The console first side 176 is disposed forward of the console second side 178 relative to the central longitudinal axis A when the console 114 is in the first position 122 and the console first side 176 being disposed rearward of the console second side 178 relative to the central longitudinal axis A when the console is in the second position 124. The console front 172 is disposed rearward of the console first and second sides 176, 178 when the console is in the third operating position 126.

The vehicle 100 includes a sensor system 118 (FIG. 11) to determine if the console 114 is in the first operating position 122 (FIG. 1) or the second operating position 124 (FIG. 2). The sensor system 118 detects the position of the console 114 relative to the vehicle 100 and transmits a signal to a control unit 120. The control unit 120 controls the ground drive system 112 based on the sensed position of the console 114 such that the direction of movement of a direction control device 116 on the console 114 matches the direction in which the vehicle moves as described further below.

The sensor system 118 includes a first sensor 280 (FIG. 7) and second sensor 282. The first and second sensors 280, 282 are arranged on opposite sides of the central longitudinal axis A. The first and second sensors 280, 282 may detect the position of the console 114 in the lowered operable positon. For example, the first sensor 280 may detect when the console 114 is in the first position 122 and the second sensor 282 may detect when the console 114 is in the second position 124. In the raised position, the sensor system 118 may not detect the position of the console 114. The sensor system 118 transmits a signal to the control unit 120 indicating if the console 114 is in either the first position 122 and/or the second position 124.

In the raised position, the control unit 120 may be configured such that actuation of the control device 116 does not cause the ground drive system 112 to move the vehicle 100. In some embodiments, in the raised position, the control unit 120 may be configured such that actuation the implement control device 133 may not cause the implement 155 to move and/or to perform a function. This prevents an operator from inadvertently causing the vehicle 100 to move and/or drive the implement 155 while the operator is adjusting the position of the console 114. The control unit 120 may determine that the console is in the raised transfer position based on signals received from the first and second sensors 280 and 282. If the first and second sensors 280 and 282 do not detect the position of the console 114 in the lowered operating position, the control unit 120 may disengage the control device 116 and/or the implement control device 133 from the ground drive system 112 and/or the powered system 110.

In this illustrated embodiment, the first and second sensors 280, 282 are mounted to the console mount 130. The first and second sensors 280, 282 may be proximity sensors. The first and second sensors 280, 282 are arranged on the console mount 130 such that the sensor system 118 may detect at least a portion of the base 154 of the support arm 134 when the console 114 is in either the first or second positions 122, 124. In alternative embodiments, the sensor system 118 may be arranged to detect the proximity of any portion of the support arm 134 or the console 114 in order to determine if the console 114 is in either one of the first or second positions, 122, 124. The proximity sensor may be, for example and without limitation, a photoelectric, an inductive, and/or a capacitive type of proximity sensor. In another example embodiment, the sensor system 118 may include a third sensor 284 (FIG. 16) that detects when the console 114 is in a third position.

In other embodiments, the sensor system includes a rotary potentiometer that detects angular movement of the support arm 134 to determine if the console 114 is in the first or second positions 122, 124.

In another example embodiment, the sensor system 118 may include a switch (e.g., proximity switch or rotary potentiometer) or any mechanism that may be used to determine if the position of the console 114 is in the lowered position or the raised position. The rotary potentiometer may be coupled to the frame 180 such that the rotary potentiometer may detect if the frame 180 is pivoted about the horizontal pivot axis $X_{114}$ as the console 114 is moved from the raised position to the lowered operating position.

The control unit 120 receives a signal from the sensor system 118 to determine whether the console 114 is in the first, second, or third positions 122, 124, 126. The control unit 120 may be communicatively coupled to the sensor system 118. The control unit 120 is also communicatively coupled to the control device 116 and/or the implement control device 133. The control unit 120 is also communicatively coupled to the ground drive system 112 such that the control unit may cause the ground drive system 112 to move the vehicle 100.

In some example embodiments, the vehicle 100 may include a wire harness 121 (FIG. 5). The wire harness 121 may transmit signals from at least one of the control device 116 and/or the implement control device 133 to the control unit 120. A wire harness may also transmit signals from the control unit 120 to at least one of the powered system 119 (e.g., ground drive system 112). In other example embodiments, the control unit 120 may be communicatively coupled wirelessly to at least one of the powered system 110, the direction control device 116, the implement control device 133 and/or the sensor system 118.

The control unit 120 may receive a signal from the direction control device 116 (FIG. 9) indicating the direction an operator has moved the direction control device 116 relative to the control axis $X_{116}$. The control unit 120 may transmit a signal to the ground drive system 112 based on signals received from the direction control device 116 and the sensor system 118. The control unit 120 causes the ground drive system 112 to move the vehicle 100 in the forward direction when the control unit 120 receives a signal from the direction control device 116 indicating that the column 302 has been pivoted towards the front 102 of the vehicle 100 along the control axis $X_{116}$ when the console 114 is arranged in any lowered operating position (i.e., any of the first, second, or third positions 122, 124, 126). Likewise, the control unit 120 causes the ground drive system 112 to move the vehicle 100 in the rearward direction when the control unit 120 receives a signal from the direction control device 116 indicating that the column 302 has been pivoted towards the rear 104 of the vehicle 100 along the control axis $X_{116}$ when the console 114 is arranged in any lowered operating position.

In some embodiments, the direction control device 116 may also be actuated across the control axis $X_{116}$ (e.g., such as a joystick which may be actuated in any direction). The control unit 120 may be configured such that steering of the vehicle 100 such as by left/right movement of the direction control device 116 is controlled based on the sensed position of the control console 114 and the direction in which the direction control device 116 is actuated. For example, movement of the direction control device 116 toward the first side 106 of the vehicle 100 results in the vehicle 100 being steered in the direction of the first side regardless of the position of the console 114 and movement of the direction control device 116 toward the second side 108 of the vehicle 100 results in the vehicle 100 being steered in the direction of the second side regardless of the position of the console 114.

The ground drive system 112 may include a device that allows the ground drive system 112 to reverse the direction of the vehicle such as through use of one or more valves (e.g., solenoid valves or hydraulic valves), switches, hydraulic pumps, hydraulic motors, and/or actuators that enable the direction of movement of the vehicle to be reversed. The control unit 120 sends a signal to the device relating to the direction the vehicle should be propelled based at least in part the sensed position of the console 114 and the direction in which the direction control device 116 is moved.

An operator may move the direction control device 116 in the forward direction to cause the ground drive system 112 to move the vehicle 100 in the forward direction regardless of if the console 114 is in either the first, second, and/or third operating positions 122, 124, 126. Additionally, an operator may move the direction control device 116 in the backwards direction to cause the ground drive system 112 to move the vehicle 100 in the backwards direction. In addition, a user may move the direction control device 116 in a direction substantially perpendicular to the control axis $X_{116}$ to cause the ground drive system 112 to move the vehicle 100 in one of a left turn and/or a right turn.

In some embodiments, the console 114 supports an implement control device 133 (FIG. 10). The implement control device 133 may be a toggle switch 133A or a joystick 133B. The implement control device 133 may control the function of an implement 155 (FIGS. 16-19 such as sweeping motion of a stump grinder boom 159) such as by valves, hydraulic motors, actuators and the like.

As shown in FIG. 12, in some embodiments of the vehicle 100, the function of the implement 155 is altered by the control unit 120 based on the position of the console 114 as sensed by the console sensor system 118. For example, in embodiments in which the vehicle 100 is a stump grinder such as in the embodiment of FIGS. 16-19, lateral movement of the cuter wheel 161 (i.e., a sweep command) as controlled by the implement control device 133 may be changed based on the position of the console 114 and the direction in which the implement control device 133 is actuated. As shown in FIGS. 11 and 13, in some embodiments, the function of the implement 155 is not affected by the position of the console 114 (e.g., movement of the implement control device 133 toward the front 102 of the vehicle may cause different movement/function of the implement 155 in any three positions 122, 124, 126).

In some embodiments, a vehicle 100 having an implement 155 and implement control device 133 is a towed vehicle such that the implement control is based on the position of the console 114 and the direction in which the implement control device 133 is actuated without the direction of the vehicle 100 being controlled on the console 114 (e.g., the direction of the vehicle 100 is controlled through the tow vehicle or the vehicle is decoupled from the tow vehicle during use of the implement 155). In other embodiments, a vehicle 100 having an implement 155 and implement control device 133 is a self-propelled vehicle in which the direction of the vehicle is also controlled based on the sensed position of the console 114.

The control unit 120, sensor system 118, direction control device 116 and ground drive system 112 may be components of a control system 131 (FIG. 11) for controlling forward and reverse direction of the vehicle 100. The control unit 120 that controls the ground drive system 112 based on the position of the console 114 may include a processor 316 and a memory 318. The processor 316 processes the signals received from various sensors, selectors and control devices of the system. The memory 318 stores instructions that are executed by the processor 316.

The control unit 120 may be a computer system. Computer systems, as described herein, refer to any known computing device and computer system. As described herein, all such computer systems include a processor and a memory. However, any processor in a computer system referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel. The control unit 120 may be implemented on hardware such as laptops, wireless devices, smartphones, workstations, or mainframe or network computer.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above are examples only, and are thus not intended to limit in any way the definition and/or meaning of the term "processor."

In one embodiment, a computer program is provided to enable control unit 120, and this program is embodied on a computer readable medium. In an example embodiment, the computer system is executed on a single computer system, without requiring a connection to a server computer. In some embodiments, the computer program is in C-code and compiled to a target operating system such as with a Sauer controller.

In a further embodiment, the computer system is run in a Windows® environment. In yet another embodiment, the computer system is run on a mainframe environment and a Linux® operating system or other UNIX® server environments. In yet a further embodiment, the computer system is run in an Apple® environment (Apple OS X or Apple iOS). In yet other embodiment, the computer system is run on a Google Android™ platform. Alternatively, the computer system is run in any suitable operating system environment. The computer program is flexible and designed to run in various different environments without compromising any major functionality. In some embodiments, the computer system includes multiple components distributed among a plurality of computing devices. One or more components may be in the form of computer-executable instructions embodied in a computer-readable medium.

The computer systems and processes are not limited to the specific embodiments described herein. In addition, components of each computer system and each process can be practiced independent and separate from other components and processes described herein. Each component and process also can be used in combination with other assembly packages and processes.

Figure 6:
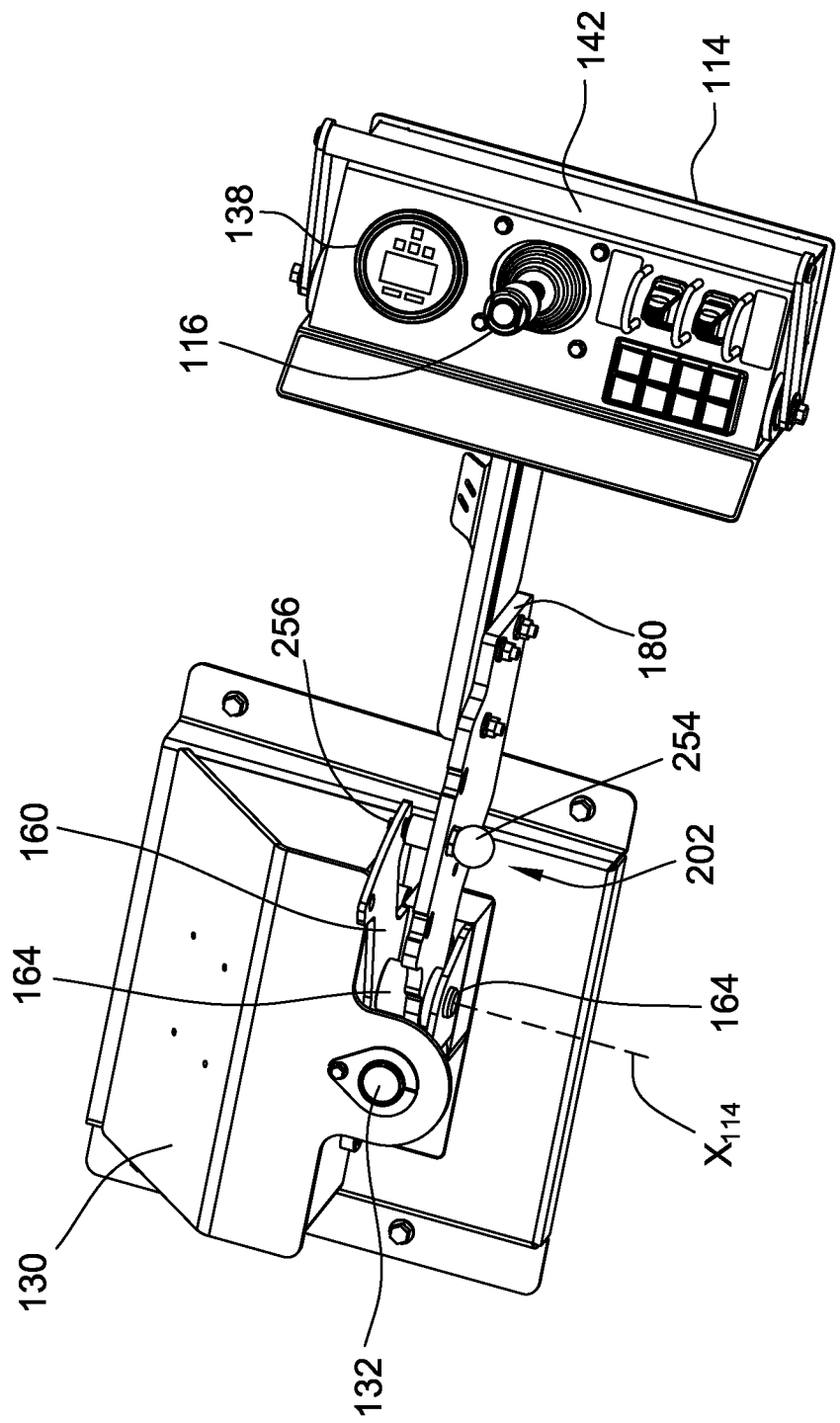
FIG. 6 is a top perspective view of the console and the support arm.
Figure 7:
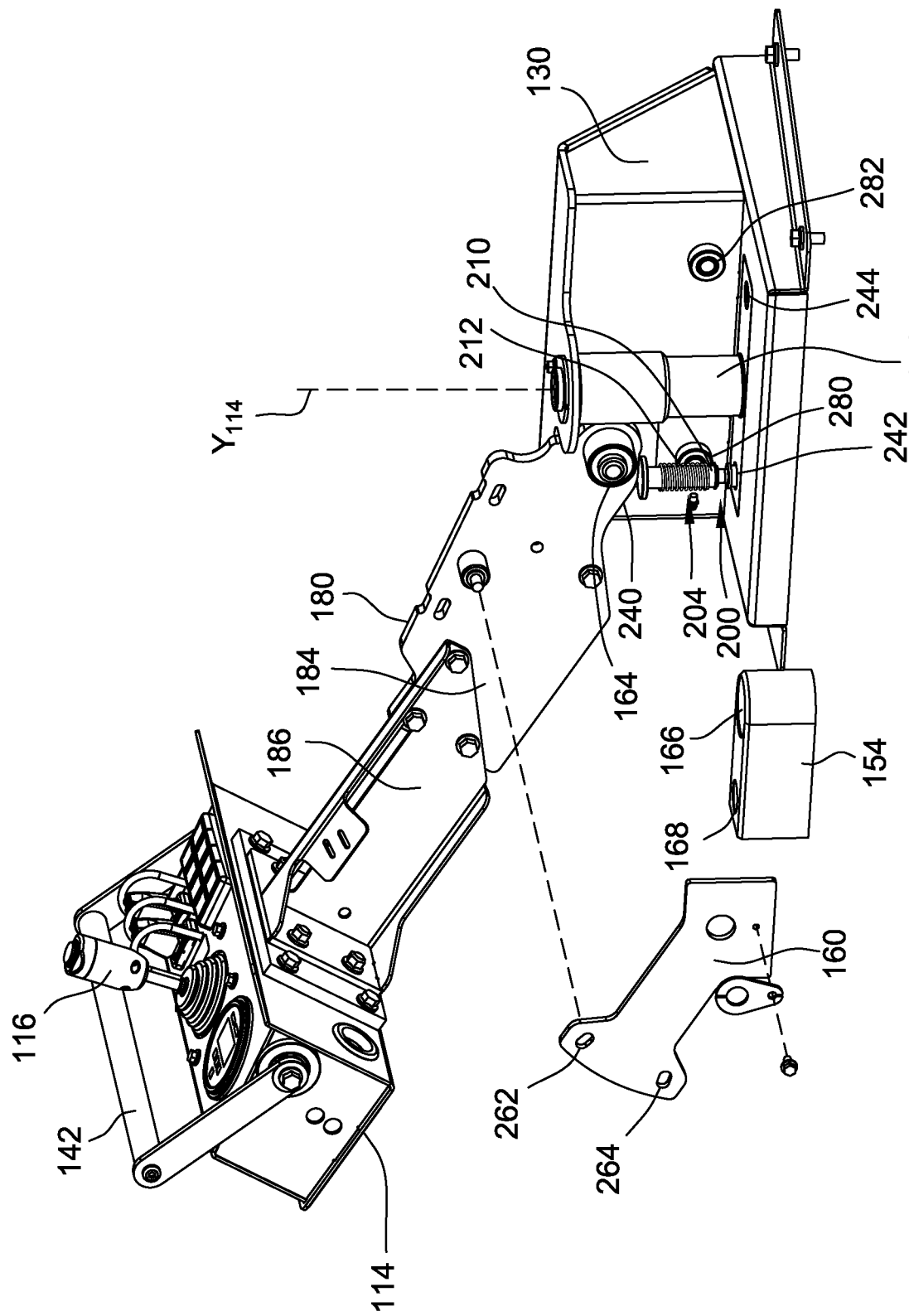
FIG. 7 is a perspective view of the console and the support arm with the console in a raised position with a second plate and a base disassembled to show a latching mechanism.
Figure 8:
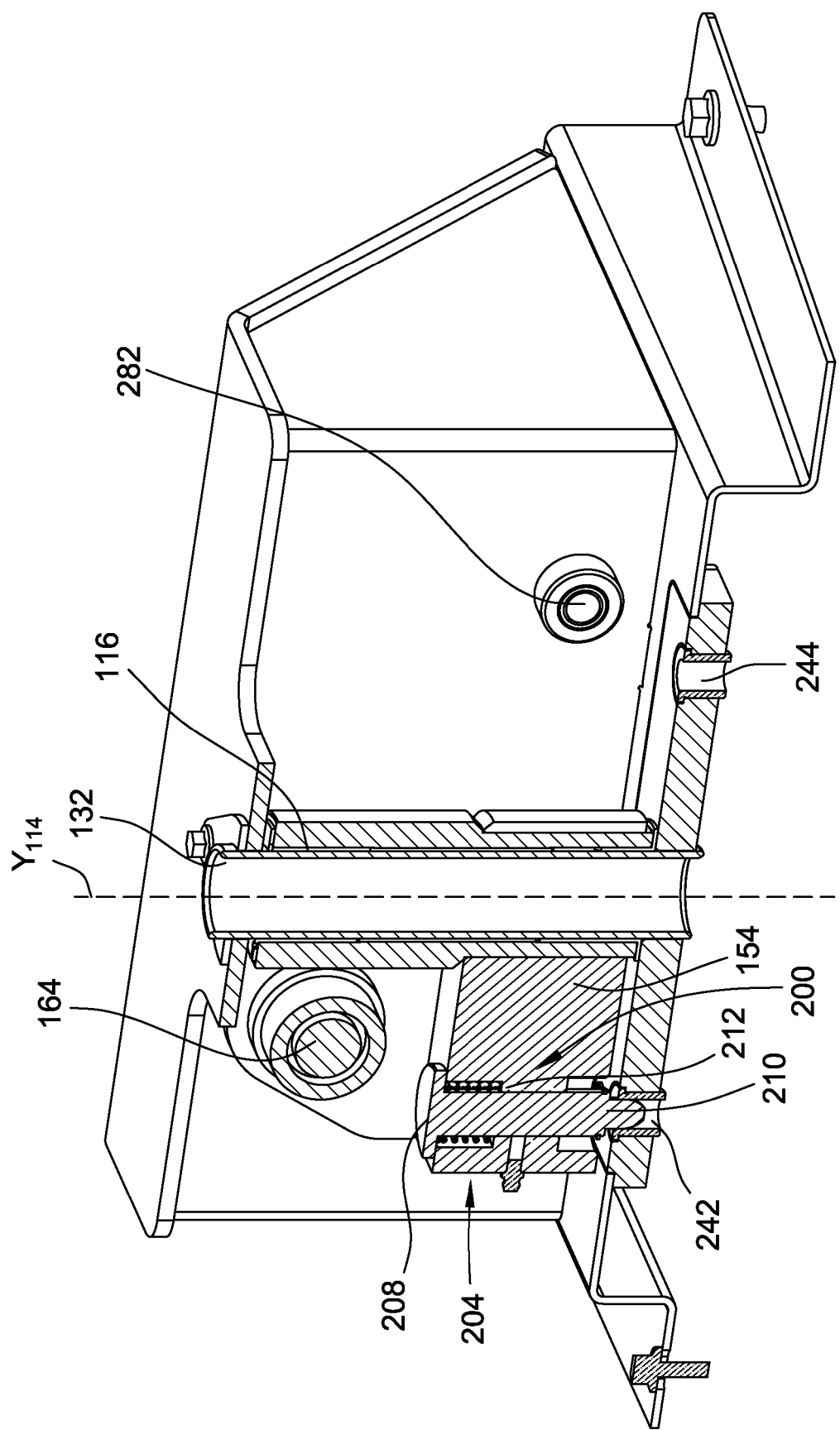
FIG. 8 is a cross-section view of the support arm and console.

The console 114 may further support a user interface 138 (FIG. 6). The user interface 138 may include any additional control devices used to control or operate a function of the vehicle, for example and without limitation, the user interface 138 may include buttons, knobs, and/or switches that may be used to start or stop the ground drive systems 112. The user interface 138 may further include a display screens and/or gauges used to provide feedback to the operator. The user interface 138 may also include decals, for example, images and/or instructions that may be interpreted by an operator, such that an operator may understand which direction to move the direction control device 116 in in order to move the vehicle 100.

Figure 14:
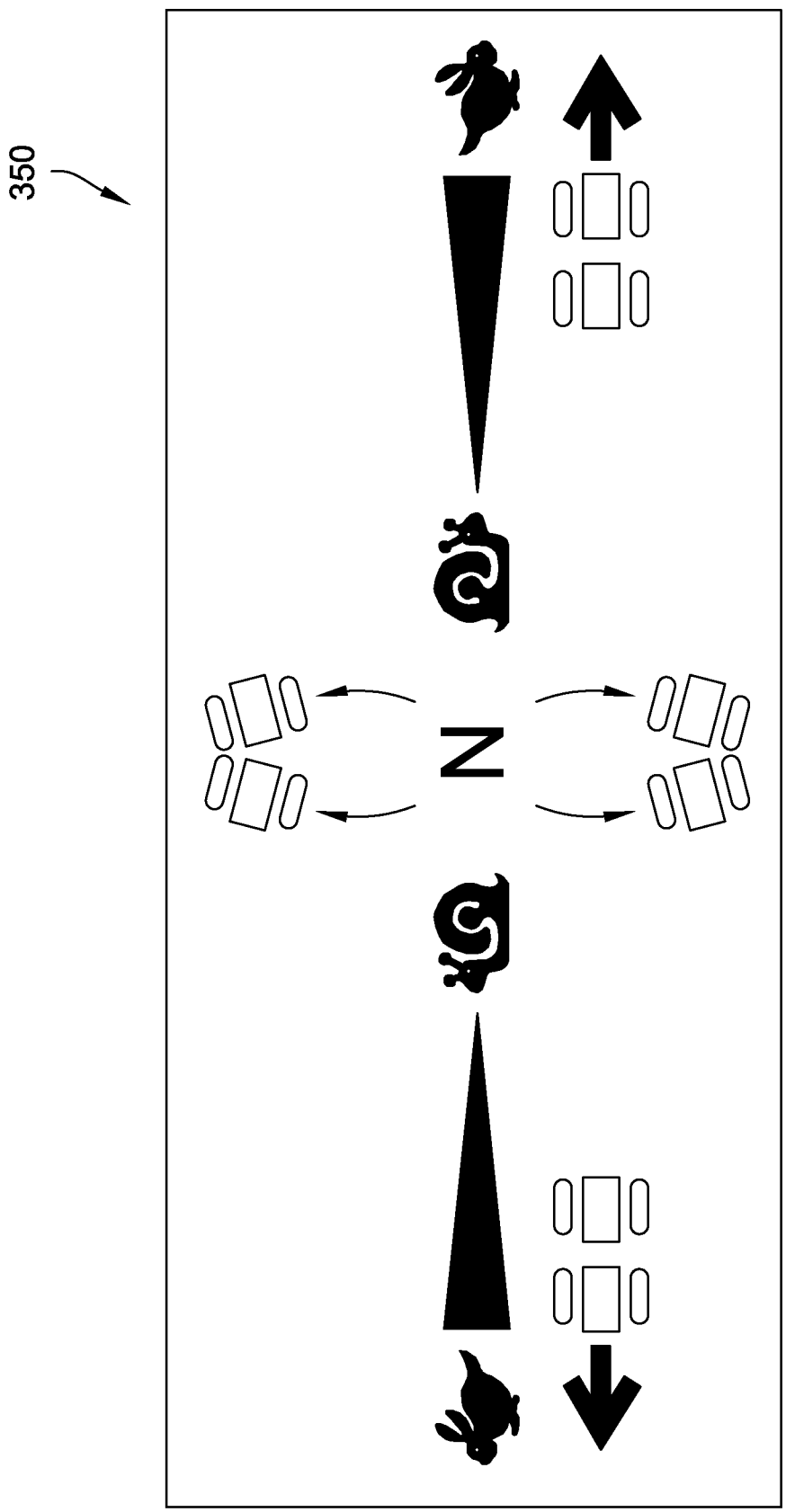
FIG. 14 is an example direction control decal.
Figure 15:
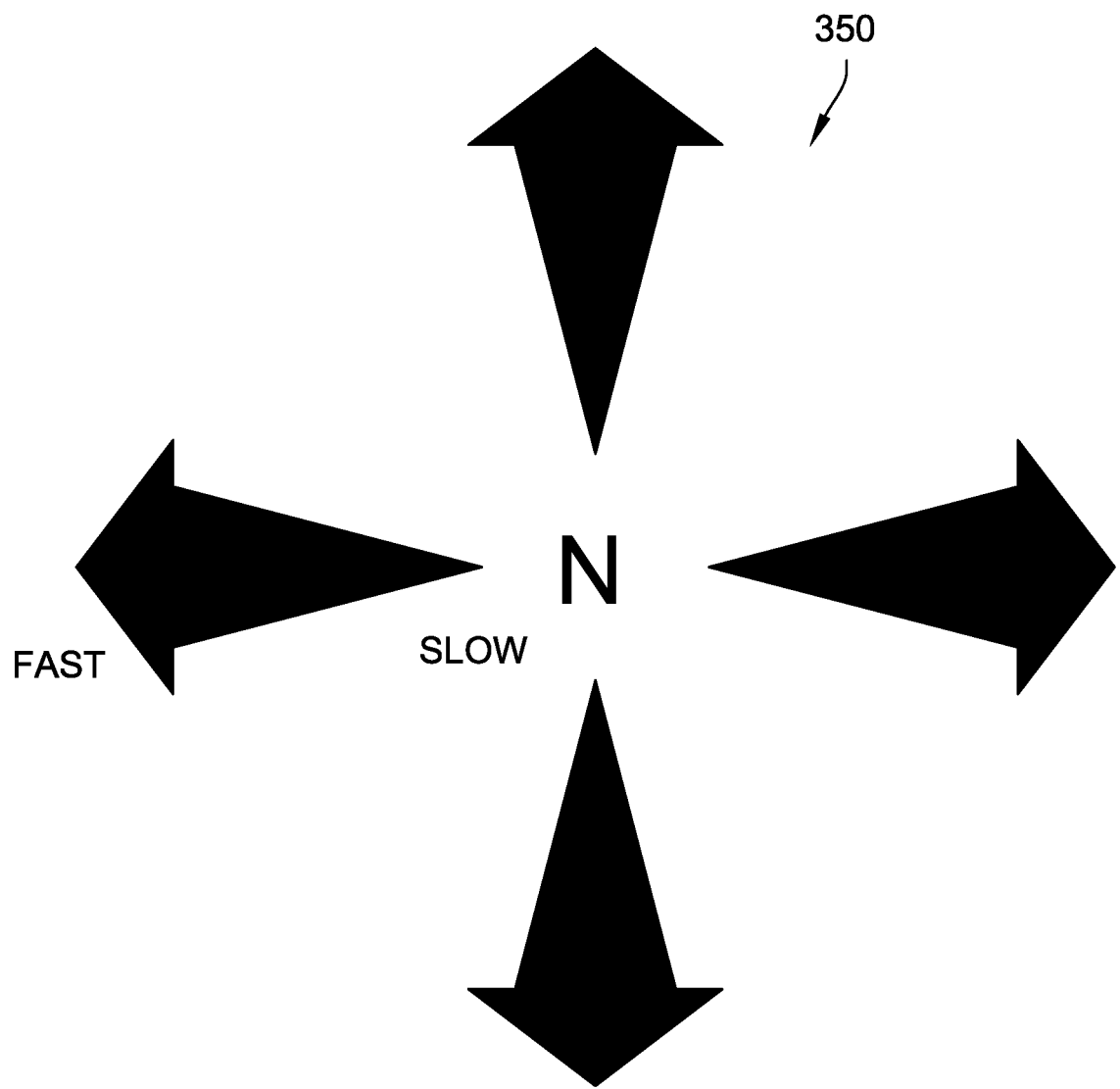
FIG. 15 is another example direction control decal.
Figure 16:
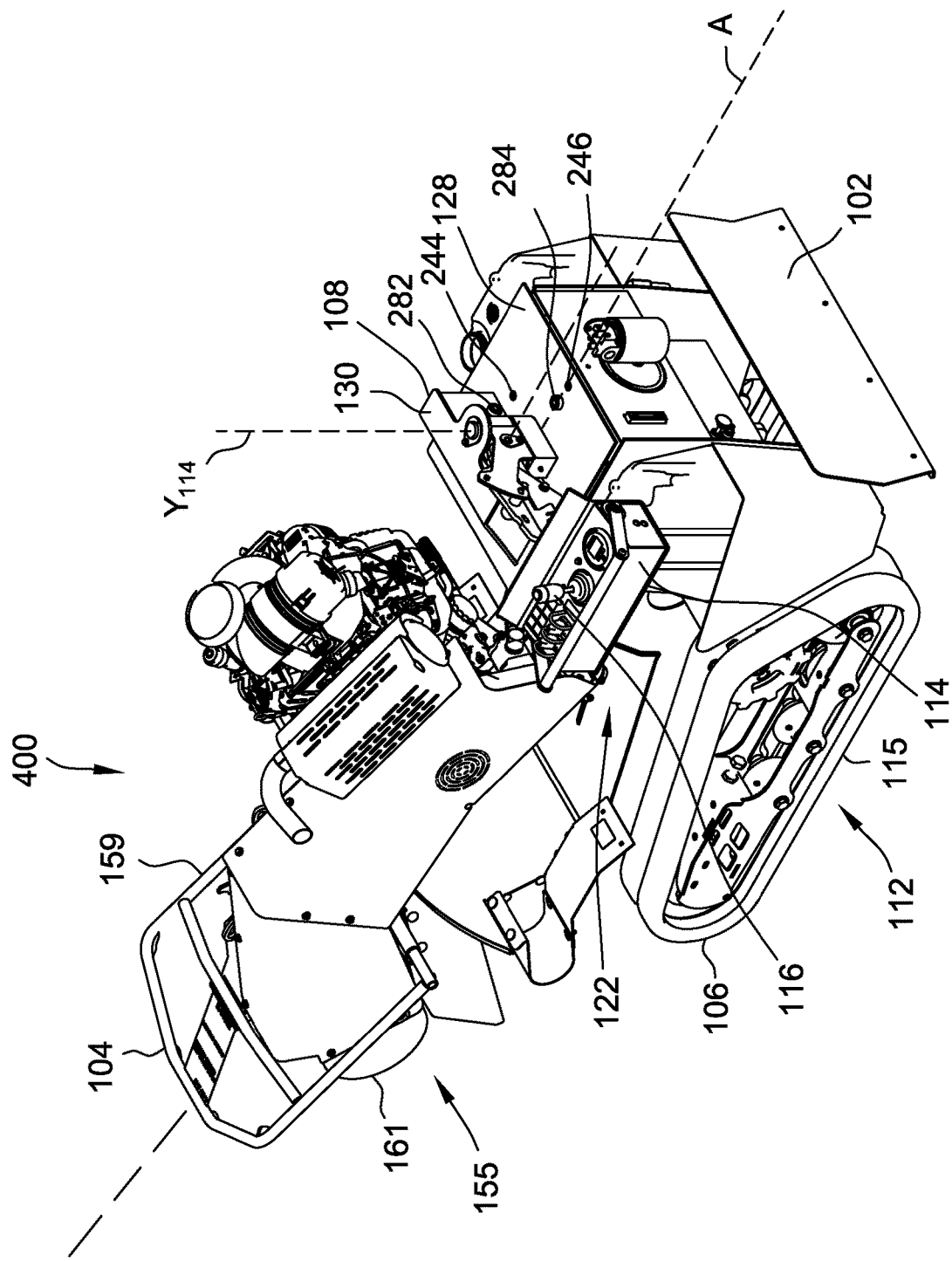
FIG. 16 is a perspective view of another example vehicle with the console in a first operating position.
Figure 17:
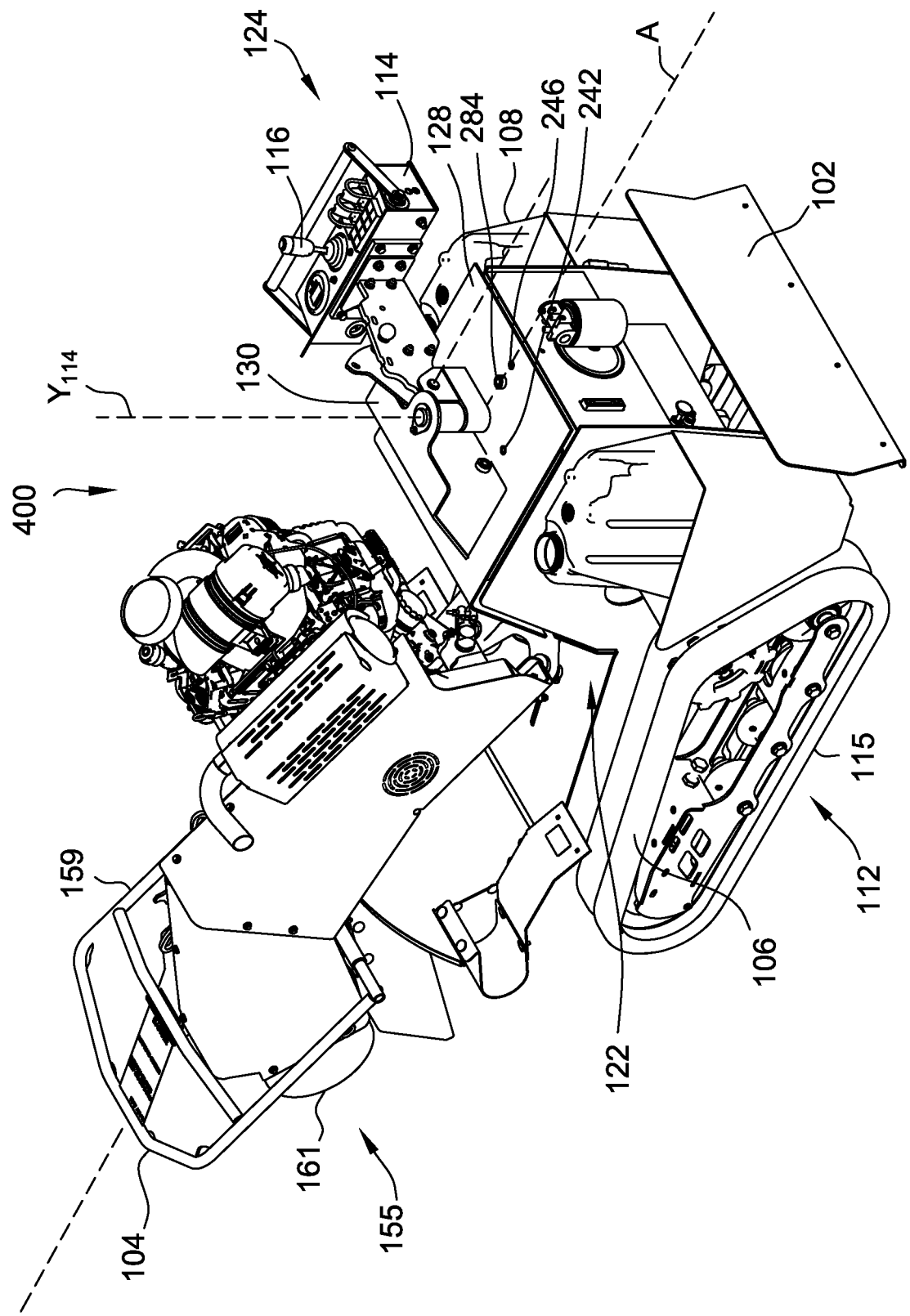
FIG. 17 is a perspective view of the vehicle with the console in a second operating position.
Figure 18:
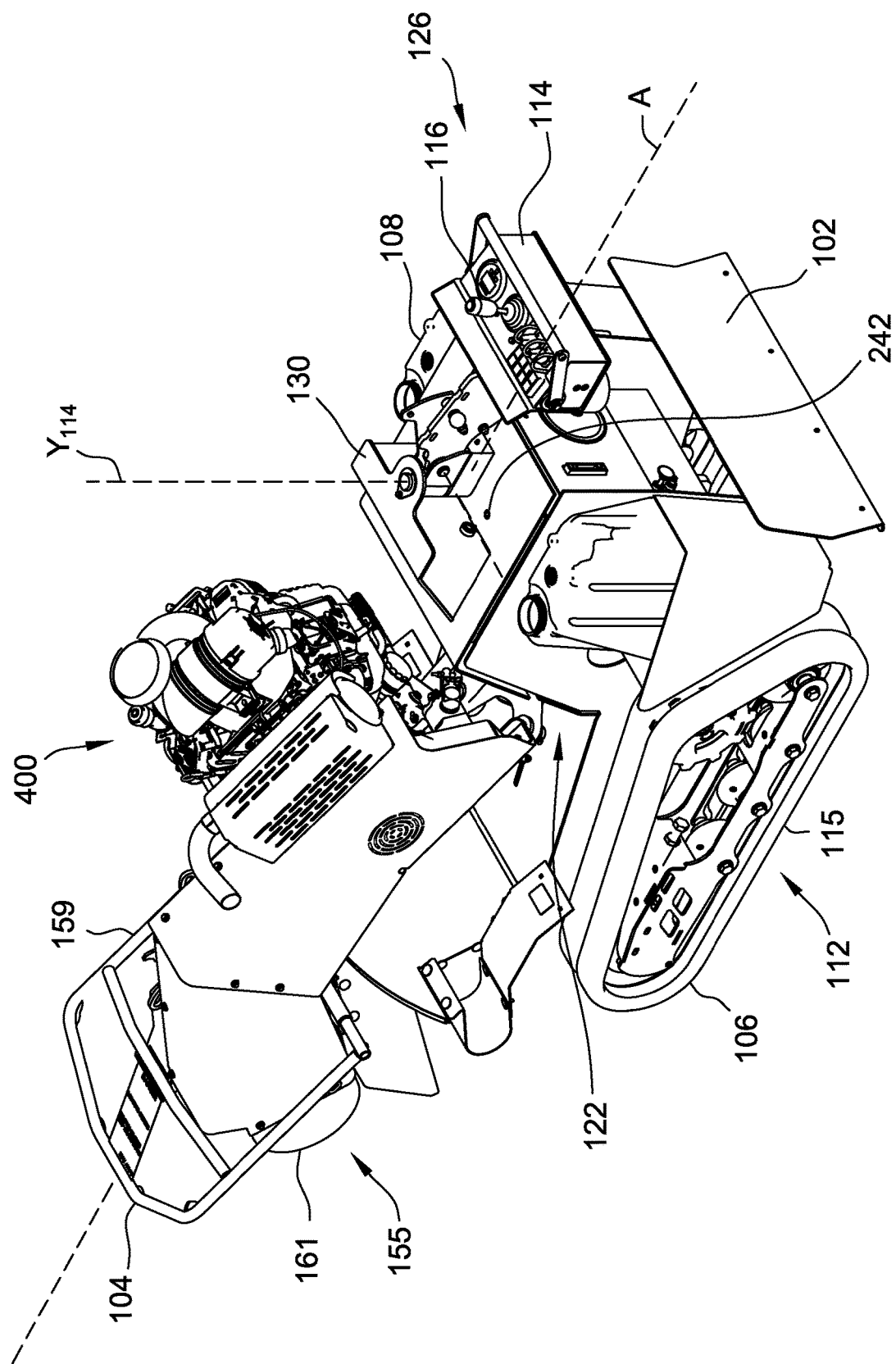
FIG. 18 is a perspective view of the vehicle with the console in a third operating position.
Figure 19:
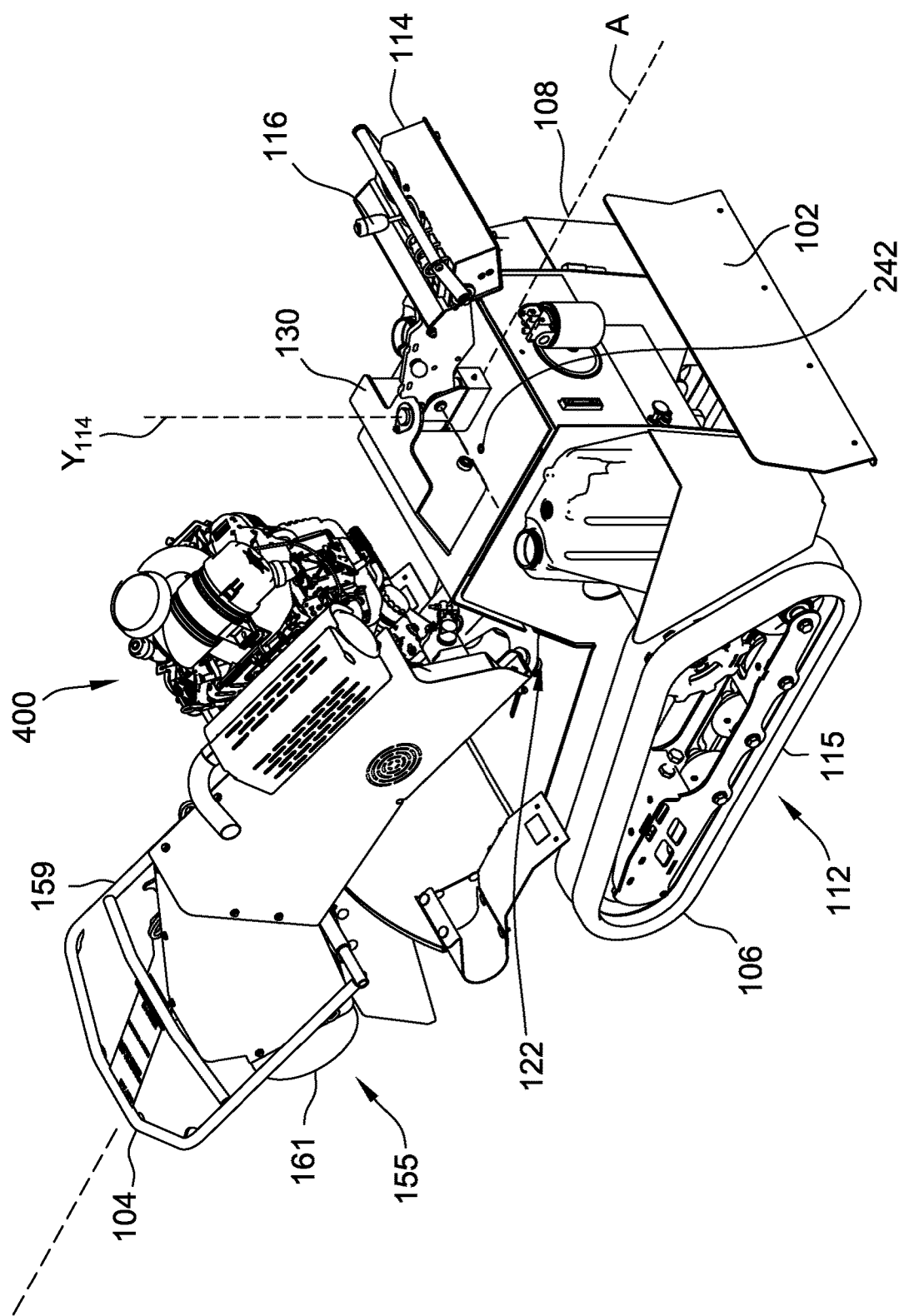
FIG. 19 is a perspective view of the vehicle with the console in a raised position.

Referring now to FIGS. 14 and 15, the decals may include a direction control decal 350 that may be included in the user interface 138. The direction control decal 350 includes symbols that may be interpreted by an operator, such that an operator may understand which direction to move the direction control device 116 in order to move the vehicle 100. The symbols are arranged on the direction control decal 350 such that regardless of the position of the console 114, an operator may interpret the direction control decal 350 in order to determine which direction to move the direction control device 116 to cause the ground drive system 112 to move the vehicle 100 in either the forward, rearward, left or right directions. The direction control decal includes a neutral position by the symbol "N", indicating to an operator that the neutral upright position of the direction control device 116 sets the ground drive system 112 in the neutral position, and does not cause the ground drive system 112 to move the vehicle 100. The direction control decal 350 also indicates that increases in motion of the direction control device 116 away from the neutral position increases the speed of the ground drive system 112, as indicated by a rabbit symbol. Additionally, the direction control decal 350 indicates that moving the direction control device closer to the neutral position, slows the ground drive system 112, as indicated by the snail symbol.

Now referring to FIGS. 16-19, an example vehicle 400 of the present disclosure is indicated generally as "400". Vehicle 400 is a stump grinder and includes the console 114 that may be pivoted to position the console 114 in either a first position 122 (FIG. 16), second position 124 (FIG. 17), or a third position 126 (FIG. 18) relative to the central longitudinal axis A. The console 114 may also be positioned in a raised position (FIG. 19) providing sufficient clearance between the support arm 134 and the console 114 and the body 128 such that an operator may pivot the console 114 to move the console 114 laterally across the central longitudinal axis A. Similar to the vehicle 100 of FIGS. 1-4, movement of the vehicle 100 is controlled based on the direction the direction control device 116 is moved and on the sensed position of the console 114.

The vehicle 400 also includes an implement 155. In the illustrated embodiment, the implement is a sweep system 155 for moving a boom 159 that carries a tool 161 (e.g., cutter wheel). The implement 155 may be controlled as shown in FIG. 14 such that the implement 155 is controlled based on the direction of movement of the implement control device 133 and on the sensed position of the console 114.

In some embodiments, the console 114 may be selectively coupled to the body 128 of the vehicle 100 at a plurality of locations (i.e., the console 114 may be separated from the vehicle body 128 and then reconnected at a different location). For example, the vehicle 100 may include at least two docking ports formed on the body 128. The docking ports may be sized and shaped to receive at least a portion of the console 114. The console 114 includes a first wire harness connected to the direction control device 116. The first wire harness includes a first connector. The docking port includes a second wire harness connected to the ground control drive system and the second wire harness includes a second connector. The console 114 may be mounted to the docking port such that at least a portion of the docking port receives and supports the console 114, such that the console 114 is coupled to the body 128 of the vehicle 100. In addition, the first connector may be connected to the second connector, such that the direction control device 116 is connected to the ground drive system 112. In this example embodiment, the docking port includes a first docking port, a second docking port, and a third docking port. The control unit 120 may determine the position of the console 114 on the docking port connector that is connected to the console 114.

In another example embodiment, the console 114 may be capable of operating as a remote console 114 that may also be selectively mounted to the vehicle at one or more docking sites or ports. In such embodiments, the control console 114 is capable of communicating to the control unit 120 by a communication link that does not include a wire, such as a radio communication link. Such a selectively remote console may include components and may operate similar to one or more of the sensor systems disclosed in WO 2017/218669, which is incorporated herein by reference for all relevant and consistent purposes. In some embodiments in which the console 114 may be selectively operated remotely, if the sensor system 118 does not detect the console 114 at a docked position, the console 114 is then operated as a remote control console. If the sensing system 118 senses that the console 118 is docked, the ground drive system 112 and/or implement 155 may be controlled as described above. In some embodiments, the control unit 120 controls forward and backward movement of the vehicle 100 in a manner that is different from the control used when the console 114 is docked to the main body 128 of the vehicle 100. For example, when the console 114 is operated remotely and undocked, the control unit 120 may move the vehicle 100 forward upon the same movement of the direction control device 116 (e.g., the same left, right, back, forward movement of the device 116) by a user regardless of where the operator is positioned relative to the vehicle 100 and may move the vehicle 100 backward upon the opposite movement of the direction control device 116 regardless of where the operator is positioned relative to the vehicle 100.

Compared to conventional vehicles, vehicles of embodiments of the present disclosure have several advantages. By using adaptive controls in which the direction of the vehicle and/or the function of an implement is controlled based on the position of the console and the direction in which the direction control/implement control device is actuated, the controls may be operated more intuitively by the operator (e.g., forward movement of the control causes forward movement of the vehicle regardless of the position of the console). This provides more clarity for operation of the vehicle controls and reduces unexpected movement of the vehicle. A control console that is moveable between different positions of the vehicle provides flexibility in vehicle operation. Consoles that are adapted for standing operation also provide flexibility and allow for increased visibility of a working implement.

As used herein, the terms "about," "substantially," "essentially," and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A vehicle having a front, rear, first and second sides, and a central longitudinal axis that passes through the front and rear, the vehicle comprising:
   a ground drive system;
   a console moveable between first and second positions disposed opposite each other across the central longitudinal axis;
   a direction control device supported by the console, the direction control device configured to selectively control movement of the vehicle in a forward direction and a rearward direction, the direction control device being moveable by a user along a control axis;
   a sensor system that senses when the console is in the first position or in the second position; and
   a control unit communicatively connected to the sensor system, the control unit being configured to cause the ground drive system to move the vehicle in the forward direction when the direction control device is moved along the control axis toward the front of the vehicle in both the first and second positions of the console and to move the vehicle in the rearward direction when the direction control device is moved along the control axis toward the rear of the vehicle in both the first and second positions of the console.

2. The vehicle as set forth in claim 1 wherein the control axis is parallel to the central longitudinal axis of the vehicle.

3. The vehicle as set forth in claim 2 wherein the direction control device may be moved in a direction perpendicular to the control axis for steering of the vehicle.

4. The vehicle as set forth in claim 1 wherein the direction control device is a joystick, lever or toggle switch.

5. The vehicle as set forth in claim 1 wherein the console is moveable to a third position that is laterally disposed between the first position and the second position, the sensor system sensing when the console is in the third position, the control unit configured to cause the ground drive system to move the vehicle in the forward direction when the direction control device is moved along the control axis toward the front of the vehicle in the third position of the console and to move the vehicle in the rearward direction when the direction control device is moved along the control axis toward the rear of the vehicle in the third position.

6. The vehicle as set forth in claim 1 wherein the console is mounted to a support arm, the support arm being pivotally connected to a body of the vehicle.

7. The vehicle as set forth in claim 1 comprising a latch for securing the console in the first position and/or in the second position.

8. The vehicle as set forth in claim 7 wherein the console is moveable to a third position that is disposed between the first position and the second position, the latch securing the console in the third position.

9. The vehicle as set forth in claim 7 wherein the latch is a spring biased latch pin.

10. The vehicle as set forth in claim 9 wherein the console is moveable between (1) a raised position in which the console may be moved laterally across the central longitudinal axis of the vehicle between the first and second positions and (2) a lowered operating position, wherein moving the console to the lowered operating position causes the latch pin to be received in a latch opening.

11. The vehicle as set forth in claim 10 comprising a first latch opening and a second latch opening, the latch pin being aligned with the first latch opening when the console is in the first position and the latch pin being aligned with the second latch opening when the console is in the second position.

12. The vehicle as set forth in claim 1 wherein the sensor system comprises a first proximity sensor that detects when the console is in the first position and a second proximity sensor that detects when the console is in the second position.

13. The vehicle as set forth in claim 12 wherein the console is moveable between (1) a raised position in which the console may be moved laterally across the central longitudinal axis of the vehicle between the first and second positions and (2) a lowered position, the first and second proximity sensors detecting the console when in the lowered position and not detecting the console when in the raised position.

14. The vehicle as set forth in claim 1 wherein the sensor system comprises a rotary potentiometer that detects when the console is in the first position and that detects when the console is in the second position.

15. The vehicle as set forth in claim 1 wherein the vehicle is configured such that the direction control device is operated by a user when standing when the console is at the first and second positions.

16. The vehicle as set forth in claim 1 wherein the control unit is configured to cause the ground drive system to move the vehicle in a direction toward the first side of the vehicle when the direction control device is moved toward the first side of the vehicle in both the first and second positions of the console and to move the vehicle in a direction toward the second side of the vehicle when the direction control device is moved toward the second side of the vehicle in both the first and second positions of the console.

17. The vehicle as set forth in claim 1 wherein the vehicle further comprises:
an implement; and
an implement control device that controls a function of an implement, the control unit configured to control the implement based on the sensed position of the console and a direction in which the implement control device is actuated.

18. The vehicle as set forth in claim 1 wherein the console is enabled to be undocked from a body of the vehicle and operated remotely.

19. A vehicle having a front, rear, first and second sides, and a central longitudinal axis that passes through the front and rear, the vehicle comprising:
a ground drive system;
a console moveable between first and second positions disposed opposite each other across the central longitudinal axis, the console having a console front disposed laterally outward from a console rear when the console is in the first and second positions, the console having a console first side and a console second side, the console first side being disposed forward of the console second side relative to the central longitudinal axis when the console is in the first position and the console first side being disposed rearward of the console second side relative to the central longitudinal axis when the console is in the second position;
a direction control device supported by the console, the direction control device configured to selectively control movement of the vehicle in a forward direction and a rearward direction;
a sensor system that senses when the console is in the first position or in the second position; and
a control unit communicatively connected to the sensor system, the control unit controlling the direction at which the ground drive system moves the vehicle based at least in part on the sensor system detecting the console in the first position or in the second position, wherein the control unit is configured to cause the ground drive system to move the vehicle in a direction toward the first side of the vehicle when the direction control device is moved toward the first side of the vehicle in both the first and second positions of the console and to move the vehicle in a direction toward the second side of the vehicle when the direction control device is moved toward the second side of the vehicle in both the first and second positions of the console.

20. The vehicle as set forth in claim 19 wherein the console is moveable to a third position, the console rear being disposed forward of the console front relative to the central longitudinal axis when the console is in the third position, the control unit controlling the direction at which the ground drive system moves the vehicle based at least in part on the sensor system detecting the console in the first position, the second position or the third position.

21. The vehicle as set forth in claim 19 wherein the console is mounted to a support arm, the support arm being pivotally connected to a body of the vehicle.

22. The vehicle as set forth in claim 19 wherein the sensor system comprises a first proximity sensor that detects when the console is in the first position and a second proximity sensor that detects when the console is in the second position.

23. The vehicle as set forth in claim 19 wherein the vehicle further comprises:
   an implement; and
   an implement control device that controls a function of an implement, the control unit configured to control the implement based on the sensed position of the console and a direction in which the implement control device is actuated.

24. A vehicle having a front, rear, first and second sides, and a central longitudinal axis that passes through the front and rear, the vehicle comprising:
   a powered system for moving at least a portion of the vehicle;
   a control console configured to be operated by a user standing alongside the control console to control the powered system, the control console being moveable between first and second positions disposed opposite each other across the central longitudinal axis;
   a control device supported by the control console, the control device configured to selectively control movement of the powered system in a first direction or a second direction by moving a portion of the control device relative to the control console;
   a sensor system that senses the position of the control console relative to the vehicle; and
   a control unit communicatively connected to the sensor system, the control unit controlling the direction at which the powered system moves at least part of the vehicle based at least in part on the sensor system detecting the position of the control console relative to the vehicle and a direction at which the control device is moved such that the direction of movement of at least part of the vehicle matches the direction the control device is moved relative to the vehicle.

25. The vehicle as set forth in claim 24 wherein the powered system is a ground drive system and wherein, in the first and second positions of the control console, the vehicle moves in a forward direction when the control device is moved in a forward direction and in a rearward direction when the control device is moved in a rearward direction.

26. The vehicle as set forth in claim 24 wherein the powered system is a sweep system for moving a boom that is mounted on the vehicle and wherein the boom moves laterally across the central longitudinal axis and wherein, in the first and second positions of the control console, the boom moves to the first side of the vehicle when the control device is moved in a direction towards the first side of the vehicle and the boom moves to the second side of the vehicle when the control device is moved in a direction towards the second side of the vehicle.

* * * * *